(12) United States Patent
Hayashi et al.

(10) Patent No.: US 8,889,220 B2
(45) Date of Patent: Nov. 18, 2014

(54) MOLD RELEASE TREATMENT METHOD, MOLD, METHOD FOR PRODUCING ANTI-REFLECTIVE FILM, MOLD RELEASE TREATMENT DEVICE, AND WASHING/DRYING DEVICE FOR MOLD

(75) Inventors: Hidekazu Hayashi, Osaka (JP); Takao Imaoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 196 days.

(21) Appl. No.: 13/579,094

(22) PCT Filed: Mar. 7, 2011

(86) PCT No.: PCT/JP2011/055276
§ 371 (c)(1),
(2), (4) Date: Aug. 15, 2012

(87) PCT Pub. No.: WO2011/111669
PCT Pub. Date: Sep. 15, 2011

(65) Prior Publication Data
US 2012/0308678 A1  Dec. 6, 2012

(30) Foreign Application Priority Data

Mar. 8, 2010 (JP) .................. 2010-051158

(51) Int. Cl.
*B29C 33/58* (2006.01)
*B29C 33/60* (2006.01)
(52) U.S. Cl.
CPC .............. *B29C 33/58* (2013.01); *B29C 33/60* (2013.01)
USPC ............. 427/133; 118/313; 425/91; 425/96; 427/302; 427/354

(58) Field of Classification Search
USPC ........ 118/62, 313; 134/99.1; 264/39; 425/91, 425/96, 99; 427/133, 302, 353, 354
See application file for complete search history.

(56) References Cited

U.S. PATENT DOCUMENTS 4,118,235 A * 10/1978 Horiuchi et al. .............. 264/338
6,359,735 B1    3/2002 Gombert et al.
(Continued)

FOREIGN PATENT DOCUMENTS

JP          6071464 U      5/1985
JP          02159358 A  *  6/1990
(Continued)

OTHER PUBLICATIONS

International Preliminary Report on Patentability dated Oct. 11, 2012.
(Continued)

*Primary Examiner* — Robert B Davis
(74) *Attorney, Agent, or Firm* — Harness, Dickey & Pierce, P.L.C.

(57) ABSTRACT

A mold release treatment method of the present invention includes: the step of providing a mold releasing agent and a mold which has a porous alumina layer over its surface, the mold releasing agent containing a fluoric compound which has mold releasability and a solvent; the step of applying over the surface of the mold a solvent that is capable of dissolving the fluoric compound; and thereafter, the step of applying the mold releasing agent over the surface of the mold according to a spray coating method. According to the present invention, a mold release treatment can be performed over a surface of the mold which has the porous alumina layer over its surface, without causing uneven application.

9 Claims, 10 Drawing Sheets

(56) References Cited

U.S. PATENT DOCUMENTS

| | | |
|---|---|---|
| 2002/0130441 A1 | 9/2002 | Robinson et al. |
| 2003/0205475 A1 | 11/2003 | Sawitowski |
| 2005/0142286 A1* | 6/2005 | Yee et al. ............ 427/133 |
| 2007/0159698 A1 | 7/2007 | Taguchi et al. |
| 2009/0194914 A1 | 8/2009 | Uozu et al. |

FOREIGN PATENT DOCUMENTS

| | | |
|---|---|---|
| JP | 10-015956 | 1/1998 |
| JP | 11156865 A | 6/1999 |
| JP | 2001517319 A | 10/2001 |
| JP | 2003531962 A | 10/2003 |
| JP | 2005156695 A | 6/2005 |
| JP | 2005270801 A | 10/2005 |
| JP | 4080440 B2 | 2/2008 |
| JP | 2010005841 A | 1/2010 |
| WO | WO-2006059686 A1 | 8/2006 |
| WO | WO-2008001847 A1 | 3/2008 |

OTHER PUBLICATIONS

International Search Report PCT/ISA/210 for International Application No. PCT/JP2011/055276 dated May 17, 2011.

* cited by examiner (a)

(b)

(a)

(b)

MOLD RELEASE TREATMENT METHOD, MOLD, METHOD FOR PRODUCING ANTI-REFLECTIVE FILM, MOLD RELEASE TREATMENT DEVICE, AND WASHING/DRYING DEVICE FOR MOLD

TECHNICAL FIELD

The present invention relates to a mold release treatment method, a mold, an antireflection film production method, a mold release treatment apparatus, and an apparatus for washing and drying a mold. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The applicant of the present application discloses, in Patent Document 4, the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing an anodized porous aluminum film can facilitate the manufacture of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film production method with the use of a moth-eye mold uses a photocurable resin. Firstly, a photocurable resin is applied over a substrate. Then, an uneven surface of a moth-eye mold which has undergone a mold release treatment is pressed against the photocurable resin in vacuum, whereby the uneven structure at the surface of the moth-eye mold is filled with the photocurable resin.

Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of producing an antireflection film with the use of the photocurable resin is disclosed in, for example, Patent Document 4.

As a mold release treatment for a mold which has a porous alumina layer for use in production of an antireflection film, for example, Patent Document 5 describes performing a mold release treatment by applying a fluoric mold releasing agent according to a spray coating method.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686
Patent Document 5: WO 2008/001847

SUMMARY OF INVENTION

Technical Problem

However, the present inventor attempted to apply a mold releasing agent over a moth-eye mold according to the spray coating method and found difficulty in uniformly performing a mold release treatment, such as occurrence of uneven application of the mold releasing agent.

This problem is not limited to the moth-eye mold but is a common problem among molds which have, over their surfaces, a porous alumina layer that has minute recessed portions of submicron order.

One of the major objects of the present invention is to provide a method for performing a mold release treatment without causing uneven application, even when the spray coating method is employed in applying a mold releasing agent over a surface of a mold which has a porous alumina layer over its surface.

Solution to Problem

A mold release treatment method of the present invention includes the steps of: (a) providing a mold releasing agent and a mold which has a porous alumina layer over its surface, the mold releasing agent containing a fluoric compound which has mold releasability and a solvent; (b) applying over the surface of the mold a solvent that is capable of dissolving the fluoric compound; and (c) after step (b), applying the mold releasing agent over the surface of the mold according to a spray coating method.

In one embodiment, the solvent used in step (b) is the same as the solvent contained in the mold releasing agent.

In one embodiment, the solvent contained in the mold releasing agent is a fluoric solvent.

In one embodiment, step (c) is performed in an atmosphere of the solvent that is capable of dissolving the fluoric compound.

In one embodiment, the method further includes (d) rinsing the surface of the mold after step (c).

In one embodiment, the method further includes (e) baking the surface of the mold between step (c) and step (d).

In one embodiment, the method further includes (f) washing the surface of the mold between step (a) and step (b).

In one embodiment, step (f) is performed using a two-fluid nozzle.

In one embodiment, the porous alumina layer has an inverted moth-eye structure over its surface, the inverted moth-eye structure having a plurality of recessed portions whose two-dimensional size viewed in a direction normal to the surface is not less than 50 nm and less than 500 nm.

A mold of the present invention includes a porous alumina layer over its surface, wherein the mold is provided with a mold release treatment according to any of the above-described mold release treatment methods.

An antireflection film production method of the present invention includes the steps of: providing the above-described mold and a work; and irradiating a UV-curable resin provided between the mold and a surface of the work with ultraviolet light, thereby curing the UV-curable resin.

A mold release treatment apparatus of the present invention is an apparatus for performing a mold release treatment on a surface of a mold, including: a mold releasing agent nozzle for applying a mold releasing agent over a surface of a mold, the mold releasing agent containing a fluoric compound which has mold releasability and a solvent; a solvent nozzle for applying over a surface of a mold a solvent that is capable of dissolving the fluoric compound; an application chamber which is provided with the mold releasing agent nozzle and the solvent nozzle; and a solvent bath in which the solvent that is capable of dissolving the fluoric compound is contained, wherein the solvent in the solvent bath evaporates to form an atmosphere of the solvent in the application chamber, and after the solvent is applied by the solvent nozzle over the surface of the mold, the mold releasing agent nozzle sprays the mold releasing agent over the surface of the mold in the application chamber.

A washing/drying apparatus of the present invention is an apparatus for washing and drying a surface of a mold, including: a washing nozzle for applying a washing solution over a surface of a mold; and a gas blowing section which has a plurality of ejection holes for blowing a gas against the surface of the mold, the gas blowing section being configured to blow a gas against part of the surface of the mold which has been washed with the washing solution from the washing nozzle, thereby drying the part, wherein the plurality of ejection holes are arranged in different rows.

In one embodiment, the apparatus further includes a projection section provided between the washing nozzle and the gas blowing section, the projection section extending from a surface of the gas blowing section which has the plurality of ejection holes toward the surface of the mold, wherein the projection section has a hole for taking in a floating mist.

In one embodiment, the method further includes (g) after step (f), drying the surface of the mold.

In one embodiment, the method further includes (h) after step (g), baking the surface of the mold.

In one embodiment, the method further includes (i) after step (d), drying the surface of the mold.

In one embodiment, the method further includes (j) after step (i), baking the surface of the mold.

In one embodiment, the method further includes (k) after step (j), performing an external appearance inspection on the surface of the mold.

Advantageous Effects of Invention

The present invention provides a method for performing a mold release treatment without causing uneven application, even when the spray coating method is employed in applying a mold releasing agent over a surface of a mold which has a porous alumina layer over its surface.

DESCRIPTION OF EMBODIMENTS

Figure 1:
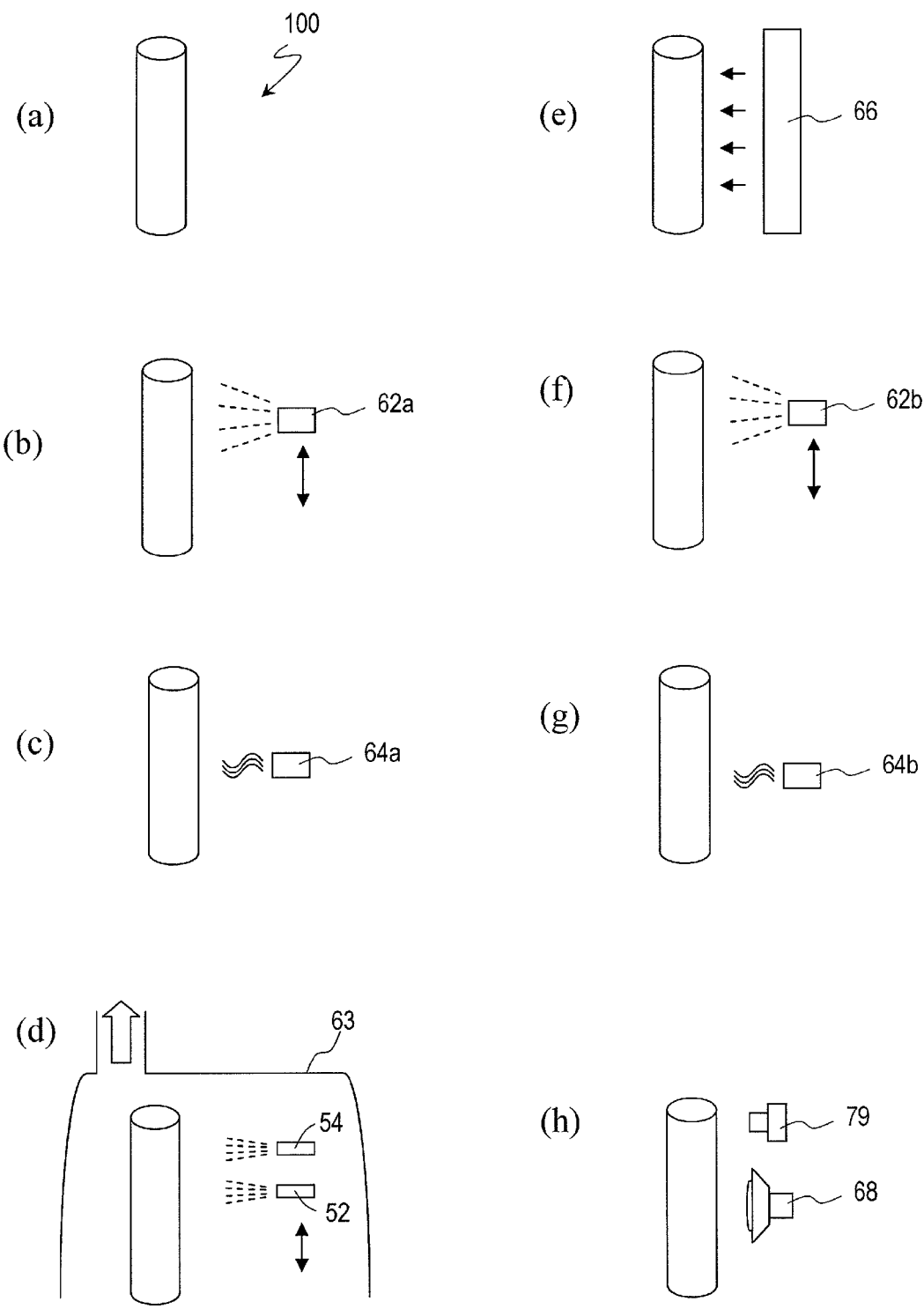
FIG. 1 (a) to (h) are schematic diagrams for illustrating a mold release treatment method of an embodiment of the present invention.

Hereinafter, a mold release treatment method of an embodiment of the present invention is described with reference to the drawings, although the present invention is not limited to the embodiment exemplified below. The description below is provided with an example where a mold release treatment is performed on a moth-eye mold. Note that the "moth-eye mold" includes, for example, a moth-eye mold in the form of a flat plate and a moth-eye mold in the form of a roll.

Hereinafter, a mold release treatment method for a moth-eye mold according to an embodiment of the present invention is described with reference to FIGS. 1(a) to 1(h). FIGS. 1(a) to 1(h) are schematic diagrams for illustrating a mold release treatment method of an embodiment of the present invention.

First, as shown in FIG. 1(a), a moth-eye mold 100 in the form of a roll is provided. Using the moth-eye mold 100 in the form of a roll is advantageous in that, for example, an antireflection film can be efficiently mass-produced according to a roll-to-roll method. The moth-eye mold 100 has a porous alumina layer which has a plurality of recessed portions over its surface. The two-dimensional size of the plurality of recessed portions when viewed in a direction normal to the surface is not less than 50 nm and less than 500 nm. The moth-eye mold 100 is obtained by repeating anodization and etching of aluminum according to, for example, the methods described in Patent Documents 3 and 4 mentioned above. A method for manufacturing the moth-eye mold 100 will be described later.

The moth-eye mold 100 in the form of a roll is preferably arranged in an upright position such that the long axis direction is generally parallel to the vertical direction as shown in FIG. 1(a), for example. When the moth-eye mold 100 in the form of a roll is arranged in an upright position, the flowability of a mold releasing agent applied over the perimeter surface of the moth-eye mold 100 improves. In other words, the mold releasing agent more readily spreads.

Then, the moth-eye mold 100 is washed. By washing the moth-eye mold 100, a residual foreign substance is removed, for example. Also, as will be described later, by washing the moth-eye mold 100, the effect of a mold release treatment can be improved as compared to a case where it is not washed.

According to the researches conducted by the present inventor, when a mold release treatment was performed on a moth-eye mold which had been left in the air for a long period of time after manufacture, sufficient mold releasability was not obtained in some cases. It is estimated that the failure to obtain sufficient mold releasability is attributed to formation of a hydrate over the surface of the porous alumina layer of the moth-eye mold as described below. Hereinafter, the description is provided with an example where an oxalic acid aqueous solution is used as an electrolytic solution for anodization. Over the surface of the porous alumina layer immediately after the anodization, there are a hydrous alumina, an aluminum-oxalic acid chelate, and an oxalate (see http://www.alumite.co.jp/CAT/syusan.htm). When a moth-eye mold is left in the air, the substances present over the surface cause a reaction with moisture in the atmosphere so that an alumina hydrate or a carboxylic acid which is derived from an oxalate is formed. When an alumina hydrate (e.g., boehmite) is formed at the surface of an anodic oxide film, the adhesion of the surface degrades (see, for example, "the state of the art in the surface treatment technology for aluminum architecture materials", *Technical Information Pamphlet*, Nihon Anodizing Co., Ltd., 2009 November, p. 14). Therefore, as described above, it is inferred that, in part of the surface of the moth-eye mold in which a hydrate is formed, a fluoric compound with mold releasability, which is contained in a mold releasing agent that will be described later, has degraded adhesion. As a result, it is inferred that, even though a mold releasing agent was applied to the part in which a hydrate was formed, sufficient mold releasability was not obtained.

Even when a moth-eye mold is left in the air for a long period of time after manufacture, the adhesion of the fluoric compound to the surface can be improved by washing the surface of the moth-eye mold to remove a hydrate. Therefore, the effect of the mold release treatment can be improved as compared to a case where the mold release treatment is performed without washing. As will be described later, when a mold release treatment is performed on a moth-eye mold which has been left in the air for, for example, 48 hours after manufacture, it is preferred to wash the moth-eye mold before a mold releasing agent is applied.

In the washing step, for example, as shown in FIG. 1(b), a washing solution sprayed from a shower nozzle 62a moving along the long axis direction of the moth-eye mold 100 (the direction indicated by the arrow in FIG. 1(b)) over the perimeter surface of the moth-eye mold 100, whereby the moth-eye mold 100 is washed. In this step, the moth-eye mold 100 is rotated along the perimeter direction such that the washing solution can be applied over the entire perimeter surface of the moth-eye mold 100. The washing solution used may be, for example, pure water, reduced electrolytic ion water, a detergent, an organic solvent (e.g., acetone), or phosphoric acid. Examples of the washing method other than the shower washing include, for example, running-water washing, immersion washing, and an electrostatic fogging method. In the case of immersion washing, the moth-eye mold 100 immersed in a washing solution may be subjected to an ultrasonic wave (ultrasonic washing).

Alternatively, dry washing may be performed. The dry washing used may be, for example, the method of irradiating the mold with excimer UV light, or the method of irradiating the mold with plasma generated under the atmospheric pressure or $O_2$ plasma.

The washing may be realized by using multiple ones of the aforementioned washing methods. For example, the mold may be immersed in phosphoric acid and thereafter washed with flowing pure water. Note that, as will be described later, in order to improve the effect of the mold release treatment, the washing with reduced electrolytic ion water or the washing with phosphoric acid is particularly preferred.

Then, when necessary, the surface of the moth-eye mold 100 may be dried. As shown in FIG. 1(c), the mold may be dried by, for example, blowing compressed air against the mold using an air knife 64a. The mold may be dried by a $N_2$ blow. Alternatively, the surface of the moth-eye mold 100 may be dried using a vacuum dryer.

After the surface of the moth-eye mold 100 is dried, baking (heat treatment) may be performed. By performing the baking, liquid droplets of micron order adhering on the surface of the moth-eye mold 100, or liquid droplets on the order of several hundreds of nanometers which are trapped in the plurality of recessed portions over the surface of the porous alumina layer, can be removed. For example, the moth-eye mold 100 may be heated in a clean oven (e.g., at 150° C. for 30 minutes). Alternatively, heated dry air may be blown against the mold. Still alternatively, a far-infrared heater may be used.

Then, application of a solvent and application of a mold releasing agent are performed. The mold releasing agent used may be a fluoric mold releasing agent containing a fluoric compound which has mold releasability and a solvent. The fluoric mold releasing agent used may be, for example, FluoroSurf manufactured by Fluoro Technology. The FluoroSurf may be, for example, FluoroSurf FG-5010Z130-0.1. FluoroSurf FG-5010Z130-0.1 contains a perfluorooctylethyl acrylate homopolymer as the fluoric compound and a dilution agent ZV (hydrofluoroether) as the solvent. For example, in FluoroSurf FG-5010Z130-0.1, the concentration of the perfluorooctylethyl acrylate homopolymer is 0.1%.

The application of the solvent may be realized by, for example, using a spray nozzle 52 which is movable along the long axis direction of the moth-eye mold 100 according to the spray coating method as shown in FIG. 1(d). In this step, the moth-eye mold 100 is rotated such that the solvent can be applied over the entire perimeter surface of the moth-eye mold 100. The solvent applied herein may be, for example, the aforementioned dilution agent ZV. The dilution agent ZV is available from Fluoro Technology, for example. Note that the solvent may not be a solvent contained in the mold releasing agent, but may be a solvent that is capable of dissolving a fluoric compound which is contained in the mold releasing agent and which has mold releasability, such as Vertrel XF manufactured by Du Pont-Mitsui Fluorochemicals Co., Ltd.

The mold releasing agent is applied over the surface of the moth-eye mold 100 on which the solvent has been applied, according to the spray coating method. For example, the mold releasing agent is applied using a spray nozzle 54 which is movable along the long axis direction of the moth-eye mold 100 as shown in FIG. 1(d). In this step, the moth-eye mold 100 is rotated as in the step of applying the solvent, such that the mold releasing agent can be applied over the entire perimeter surface of the moth-eye mold 100. When the treatment is performed from the upper end to the lower end of the moth-eye mold 100, the mold releasing agent may be sprayed from the spray nozzle 54 while the solvent is sprayed from the spray nozzle 52. In this case, the spray nozzle 52 and the spray nozzle 54 are kept separate from each other by a predetermined space and are moved parallel to the long axis. Note that each of the spray nozzle 52 and the spray nozzle 54 may be independently moved such that the mold releasing agent is applied after the solvent has been applied.

In the case where the mold releasing agent is applied over the surface of the porous alumina layer of the moth-eye mold according to the spray coating method, the mold release treatment cannot be uniformly performed in some cases, such as occurrence of uneven application of the mold releasing agent, as will be described later. One of the possible causes of this problem is that, when the spray coating method is used, before droplets of the mold releasing agent ejected from the spray nozzle reach the surface of the moth-eye mold, part of the solvent in the mold releasing agent droplets evaporates so that the fluoric compound contained in the mold releasing agent can readily segregate. According to the mold release treatment method of the embodiment of the present invention, the solvent has been applied over the surface of the porous alumina layer of the moth-eye mold before the mold releasing agent is applied. Therefore, the fluoric compound in the mold releasing agent droplets which have reached the surface is diluted so that the fluoric compound can be diffused over the surface before the solvent evaporates. Therefore, the mold release treatment can be provided without causing uneven application. The step of applying the solvent and the step of applying the mold releasing agent will be described in detail in a later section.

As will be described later, the application of the mold releasing agent is preferably performed in an atmosphere of the solvent. By performing the application of the mold releasing agent in an atmosphere of the solvent, evaporation of the solvent is suppressed, so that a fluoric compound which has mold releasability can spread more readily.

If, particularly, the solvent is hazardous, a local exhaust device 63 is preferably provided above the moth-eye mold 100 as shown in FIG. 1(d), such that the application of the solvent can be performed while the gas is drained off.

Then, the surface of the moth-eye mold 100 is baked. By baking the surface, the reaction between the surface of the porous alumina layer of the moth-eye mold 100 and the fluoric compound can be enhanced. For example, the baking is performed using a heater 66 as shown in FIG. 1(e). Note that the baking process performed herein can be performed according to a method similar to the above-described baking method.

Then, the mold is rinsed such that an excessive portion of the mold releasing agent is removed. The rinse step may be performed, for example, using a spray nozzle 62b which is movable along the long axis direction of the moth-eye mold 100 according to a shower method as shown in FIG. 1(*f*). In this step, the moth-eye mold 100 is rotated such that the rinse solution can be applied over the entire perimeter surface of the moth-eye mold 100. The spray nozzle 62b used may be, for example, a two-fluid nozzle. The two-fluid nozzle is configured to mix a liquid and a compressed gas and eject the mixture, so that the liquid in the form of a mist can be ejected. By using the two-fluid nozzle, liquid droplets can be atomized, and therefore, the rinse agent can advantageously be applied to the moth-eye mold 100 with improved adhesion. Also, using the two-fluid nozzle enables control of the ejection pressure of the compressed gas and therefore enables high-pressure application. Thus, an excessive portion of the mold releasing agent can be efficiently removed. Further, there is an advantage that adhesion of a floating foreign substance can be prevented. The rinsing may be realized according to, for example, a dipping method instead of a showering method.

The rinse solution used may be, for example, a solvent contained in the above-described mold releasing agent. By rinsing the mold with a solvent, an excessive portion of the fluoric compound is removed, so that a film of the fluoric compound has a decreased and/or uniform thickness. As the film of the mold releasing agent is thinner and more uniform, the accuracy of the dimensions of the uneven structure of the surface of the moth-eye mold 100 is less affected by the mold releasing agent. Note that it is preferred that a monomolecular film of the fluoric compound is formed over the surface. The thickness of the monomolecular film is about 1 nm to 4 nm.

The film thickness of the mold releasing agent can be obtained using, for example, a scanning probe microscope (SPM), such as an atomic force microscope (AFM). The film thickness can also be obtained from the cross-sectional structure using a scanning transmission electron microscope (STEM). Also, the film thickness can be obtained using an X-ray electron spectroscopy for chemical analysis (ESCA).

The apparatus for performing the rinse step may have a reservoir for storage of the rinse solution and pipes for circulation of the rinse solution such that the rinse solution can be reused. The reservoir for storage of the rinse solution or the pipes for circulation of the rinse solution may have a filter for filtering the rinse solution.

Then, the rinse solution is removed from the surface of the moth-eye mold 100. In other words, the surface of the moth-eye mold 100 is dried. For example, as shown in FIG. 1(*g*), the surface is dried using an air knife 64b. Any drying method other than the aforementioned may be used for drying.

Thereafter, when necessary, the moth-eye mold 100 may be baked (subjected to a heat treatment). By baking the mold, a residuum of the rinse solution adhering on the surface of the moth-eye mold 100 can be removed. The baking method used herein may be the same as the above-described baking method.

In this way, a moth-eye mold is obtained in which the mold release treatment has been provided over the surface of the porous alumina layer.

Subsequently, the external appearance of the moth-eye mold 100 may be inspected. In the external appearance inspection, for example, as shown in FIG. 1(*h*), the perimeter surface of the moth-eye mold 100 is illuminated by an illuminator 68, and inspection for adhering foreign substances is carried out using a camera 79. Thereafter, the moth-eye mold 100 is used for production of an antireflection film, for example.

According to the mold release treatment method of the embodiment of the present invention, a solvent that is capable of dissolving a fluoric compound which has mold releasability is applied over a surface of a moth-eye mold before a mold releasing agent is applied over the surface according to the spray coating method, whereby a mold release treatment is provided without causing uneven application. Note that, among the respective steps of the mold release treatment method that has been described with reference to FIG. 1, the steps other than the solvent application step and the mold releasing agent application step, such as the washing step and the drying step, may be omitted.

Hereinafter, the solvent application step and the mold releasing agent application step in the mold release treatment method of the embodiment of the present invention are described in detail with reference to FIG. 2.

Figure 2:
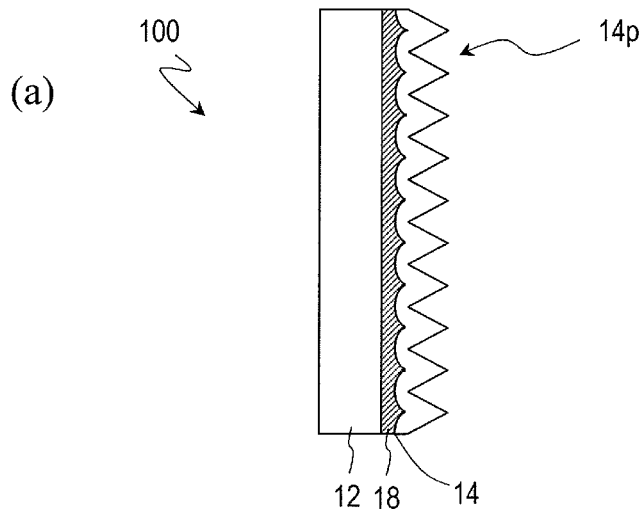
FIG. 2 (a) to (c) are schematic diagrams for illustrating a mold release treatment method of an embodiment of the present invention.
Figure 2:
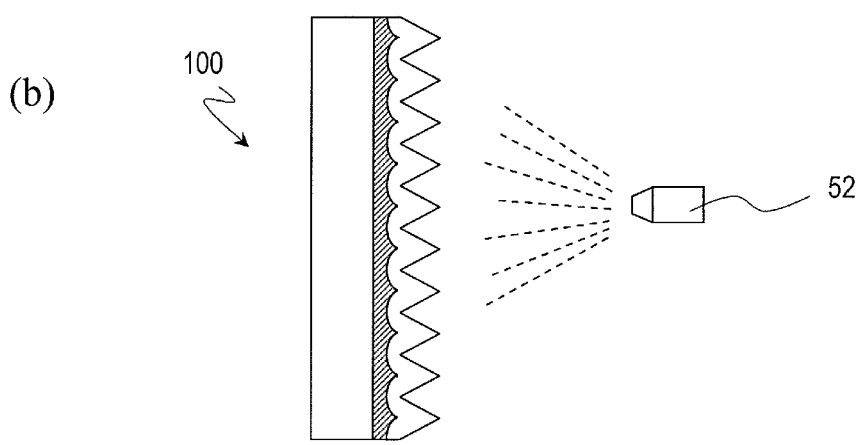
Figure 2:
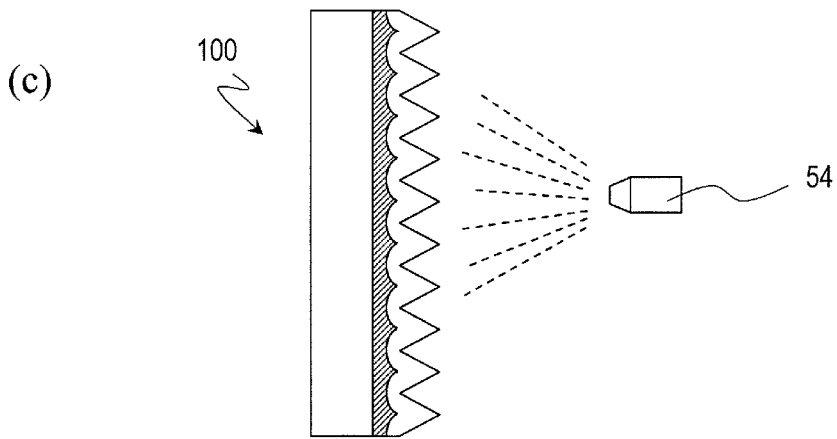

Firstly, a moth-eye mold 100 which has a porous alumina layer over its surface as shown in FIG. 2(*a*) and a mold releasing agent (not shown) are provided. The moth-eye mold 100 includes, for example, a support 12 in the form of a roll (e.g., a pipe made of stainless steel), an aluminum film 18 formed on the surface of the support 12 that is in the form of a roll, and a porous alumina layer 14 formed on the aluminum film 18. Note that, for the sake of simplicity, as for the moth-eye mold 100, FIG. 2(*a*) only shows part of the support 12 in the form of a roll, part of the aluminum film 18, and part of the porous alumina layer 14. Likewise, FIGS. 2(*b*) and 2(*c*) only show part of the moth-eye mold 100. The porous alumina layer 14 has a plurality of minute recessed portions (micropores) 14p. The two-dimensional size of the plurality of minute recessed portions 14p when viewed in a direction normal to the surface is not less than 50 nm and less than 500 nm. The moth-eye mold 100 can be manufactured by repeatedly performing anodization and etching on the aluminum film 18 formed on the support 12 in the form of a roll as will be described in detail in a later section.

The mold releasing agent used may be a fluoric mold releasing agent that contains a fluoric compound which has mold releasability and a solvent. The fluoric mold releasing agent used may be selected from a wide variety of known fluoric mold releasing agents. For example, FluoroSurf manufactured by Fluoro Technology may be used. The FluoroSurf may be, for example, FluoroSurf FG-5010Z130-0.1 as described above. FluoroSurf FG-5010Z130-0.1 contains a perfluorooctylethyl acrylate homopolymer as the fluoric compound and a dilution agent ZV (hydrofluoroether) as the solvent. Some FluoroSurf products contain, for example, a non-inflammable fluoric solvent or a petroleum solvent in addition to the aforementioned solvent. Examples of the non-inflammable fluoric solvent other than hydrofluoroether include perfluoropolyether, perfluoroalkane, hydrofluoropolyether, and hydrofluorocarbon. These non-inflammable fluoric solvents may be used solely, or two or more of them may be used in the form of a mixture. The petroleum solvent may be, for example, n-heptane, acetone, or a mixture of n-heptane and acetone.

An example of the fluoric mold releasing agent other than the aforementioned is OPTOOL DSX manufactured by DAIKIN INDUSTRIES, LTD. Alternatively, a clear coat manufactured by Du Pont-Mitsui Fluorochemicals Co., Ltd. may be used. As the solvent for the fluoric mold releasing agent, it is preferred to use a fluoric solvent. Note that, however, an aqueous solvent or a known organic solvent may be appropriately selected for use. Note that the solvent is not limited to a solvent which is capable of dissolving the fluoric compound but may be a solvent which enables diffusion of the fluoric compound in the solvent.

The fluoric mold releasing agent is advantageous over a mold releasing agent of a different type from the fluoric mold releasing agent, such as a silicone mold releasing agent, in that the fluoric mold releasing agent has a better mold releasability for a UV-curable resin that is used for production of an antireflection film. The fluoric mold releasing agent is also advantageous in that the UV resistance is high. Further, the thickness of a layer of the fluoric mold releasing agent can readily be decreased.

According to the researches conducted by the present inventor, a moth-eye mold which underwent a mold release treatment with a mold releasing agent of a different type from the fluoric mold releasing agent, for example, a silicone mold releasing agent, failed to produce an antireflection film. The present inventor examined using a mold releasing agent of a different type from the fluoric mold releasing agent but sometimes detected that, in the production process of the antireflection film, part of a cured material layer of a UV-curable resin provided between a moth-eye mold and a work separated from the work and was remaining on the surface of the moth-eye mold. It is estimated that this failure is attributed to the facts that the UV-curable resin had low mold releasability for the employed mold releasing agent, and that the UV-resistance of the employed mold releasing agent is low. When an uneven structure of submicron order is transferred as in the case where an antireflection film is produced using a moth-eye mold, the thickness of the layer of the mold releasing agent is preferably decreased as described above. However, when a mold releasing agent of a different type from the fluoric mold releasing agent was used, it was difficult to decrease the thickness of the layer of the mold releasing agent.

The concentration of the fluoric compound which has mold releasability is preferably not less than 0.1 wt %. The present inventor prepared moth-eye mold samples which had underwent a mold release treatment with mold releasing agents at the concentrations of 0.05%, 0.10%, and 0.20% and examined the water repellency of the mold samples after the mold release treatment. When the mold releasing agent at the concentration of 0.05% was applied, the surface of the moth-eye mold included portions where the amount of the fluoric compound was smaller and therefore the mold release treatment was insufficient, so that the surface of the moth-eye mold exhibited nonuniform water repellency. On the other hand, the moth-eye mold samples which underwent the mold release treatment with the mold releasing agents at the concentrations of 0.10% and 0.20% exhibited sufficient water repellency over the entire surface.

Then, the solvent is applied over the surface of the moth-eye mold 100. In this step, for example, the solvent is applied using the spray nozzle 52 according to the spray coating method as shown in FIG. 2(b). The solvent applied in this step is, typically, a solvent contained in the mold releasing agent, but is not limited to this example. The solvent applied in this step may be a solvent that is capable of dissolving the fluoric compound which is contained in the mold releasing agent and which has mold releasability.

The spray nozzle 52 used may be a single-fluid nozzle. The single-fluid nozzle may be, for example, a single-fluid nozzle which is capable of ejecting atomizing air and pattern air simultaneously with ejection of the solvent. Droplets of the solvent ejected from the nozzle are converted into a mist by the atomizing air. By controlling the pressure of the atomizing air, the size of the mist droplets can be controlled. By controlling the pressure of the pattern air, the kinetic energy of the mist droplets can be controlled. Also, the magnitude and the shape of the spray pattern can be controlled. It is preferred that the droplets of the solvent are atomized into a mist such that the mist does not evaporate before reaching the mold. It is also preferred that the kinetic energy of the solvent droplets is controlled so as to reduce the shock which occurs when the solvent droplets collide with the surface of the moth-eye mold 100.

Then, the mold releasing agent is applied over the surface of the moth-eye mold 100 according to the spray coating method. In this step, for example, the spray nozzle 54 is used as shown in FIG. 2(c). The spray nozzle 54 used may be a two-fluid nozzle, for example. Using the two-fluid nozzle for application of the mold releasing agent is advantageous in that, for example, ejected mold releasing agent droplets can be atomized.

The surface of the porous alumina layer 14 of the moth-eye mold 100 has a plurality of minute recessed portions 14$p$. Droplets of the mold releasing agent applied over the surface are retained in the recessed portions 14$p$. Therefore, the concentration of the fluoric compound is likely to vary among the recessed portions 14$p$. Accordingly, the amount of the fluoric compound remaining on the surface after evaporation of the solvent (the thickness of the fluoric compound layer) is also likely to vary among the recessed portions 14$p$. Further, when the spray coating method is used, part of the solvent in the mold releasing agent droplets evaporates before the mold releasing agent droplets reach the surface of the moth-eye mold 100, so that the fluoric compound can readily segregate. Thus, when a mold releasing agent is applied over the surface of the porous alumina layer according to the spray coating method, the mold release treatment cannot be uniformly provided in some cases.

According to the mold release treatment method of the embodiment of the present invention, as previously described with reference to FIG. 2(b), the solvent has been applied over the surface of the porous alumina layer before the mold releasing agent is applied. Therefore, the fluoric compound in the mold releasing agent droplets arriving at the surface is diluted so that the fluoric compound can be diffused over the surface before the solvent evaporates. Therefore, the mold release treatment can be provided without causing uneven application.

The above-described step of applying the mold releasing agent (FIG. 2(c)) is preferably performed in an atmosphere of the solvent that is capable of dissolving the fluoric compound of the mold releasing agent. By applying the mold releasing agent in an atmosphere of the solvent, evaporation of the solvent from the mold releasing agent droplets ejected from the spray nozzle and evaporation of the solvent that is present on the surface of the moth-eye mold 100 can be suppressed. Therefore, the fluoric compound contained in the mold releasing agent can spread more readily.

Next, an inventive example and a comparative example are described. In Inventive Example 1, a mold release treatment was performed according to the method which has previously been described with reference to FIG. 1. In Comparative Example 1, a mold release treatment was performed according to a method which was the same as that employed in Inventive Example 1 except that the solvent application step was not performed.

In Inventive Example 1, firstly, a moth-eye mold was provided which was manufactured as described below. The moth-eye mold used herein was manufactured by repeatedly performing anodization and etching of an aluminum base according to the methods described in Patent Documents 3 and 4, for example. The base used was prepared by forming a 1 μm thick aluminum film 18 by sputtering on a substrate (glass substrate, 10 cm×10 cm, 3 cm thick).

Firstly, the anodization was performed on the base as prepared above, whereby a porous alumina layer was formed over the surface of the aluminum film 18. The anodization step was performed for 60 seconds using an oxalic acid aqueous solution (concentration: 0.05 mol/L, solution temperature: 3° C.) with the application of a voltage at 80 V. As an electrode, a Pt plate was used. The distance between the electrode and the base was 150 mm.

Then, the etching was performed such that the porous alumina layer was completely removed. The etching step was performed for 90 minutes using a phosphoric acid aqueous solution (concentration: 8 mol/L, solution temperature: 30° C.).

Then, the anodization step and the etching step were alternately performed through 5 cycles (including 5 anodization cycles and 4 etching cycles). The anodization step was performed for 60 seconds using an oxalic acid aqueous solution (concentration: 0.05 mol/L, solution temperature: 3° C.) with the application of a voltage at 80 V as described above. The etching step was performed for 20 minutes using a phosphoric acid aqueous solution (concentration: 8 mol/L, solution temperature: 30° C.).

The thus-obtained moth-eye mold had a plurality of micropores whose depth was about 400 nm and whose interpore distance was about 180 nm.

Then, as described below, a mold release treatment was performed on the moth-eye mold according to the method which has previously been described with reference to FIG. 1. Note that, as described above, after the anodization step and the etching step were performed, the moth-eye mold was left in a cleanroom at 22° C. with a humidity of 30% for 7 days before the mold release treatment was performed. The step described below was performed in a cleanroom of Cleanliness Class 1000.

First, pure water was sprayed against the surface of the moth-eye mold using a two-fluid nozzle, whereby the surface was washed. After being washed, the surface of the moth-eye mold was dried using a $N_2$ blow. After the surface of the moth-eye mold was dried, the moth-eye mold was baked using a clean oven. The baking conditions were 150° C. and 30 min.

Then, after the solvent (dilution agent ZV) was applied, the mold releasing agent FluoroSurf FG5010Z130-0.1, which contains a perfluorooctylethyl acrylate homopolymer as the fluoric compound which has mold releasability, was applied according to the spray coating method. The application of the solvent was performed using a single-fluid nozzle. The application of the mold releasing agent was performed using a two-fluid nozzle.

After the application of the mold releasing agent, a baking step, a rinse step and a drying step were performed, and thereafter, another baking step was performed. The baking steps were performed using a clean oven under the conditions of 150° C. and 30 min as described above. The rinse step was performed using a two-fluid nozzle according to a shower method. The rinse solution used was the solvent contained in the mold releasing agent.

In Comparative Example 1, a mold release treatment was performed on a moth-eye mold which was manufactured using the same method as that employed in Inventive Example 1 by applying the same mold releasing agent as that employed in Inventive Example 1 according to the spray coating method, without performing the step of applying the solvent. In other words, a mold release treatment was performed according to the same method as that employed in Inventive Example 1 except that the step of applying the solvent was not performed.

As for Inventive Example 1 and Comparative Example 1, the surface of the moth-eye mold after the mold release treatment was examined by a human eye directly below a fluorescent lamp as to whether or not the surface had a portion where application of the mold releasing agent was uneven. In Comparative Example 1, the surface of the moth-eye mold after the mold release treatment had an uneven application portion of a size which was detectable by a human eye (millimeter order). On the other hand, in Inventive Example 1, an uneven application portion was not detected by a human eye in the surface of the moth-eye mold after the mold release treatment. By applying the solvent before application of the mold releasing agent, the mold release treatment was uniformly provided.

Since in Inventive Example 1 the mold release treatment was uniformly provided, the moth-eye structure was uniformly formed over the surface of an antireflection film produced using the moth-eye mold as described below.

The antireflection film was produced as described below according to a method in which a photocurable resin is used as described in aforementioned Patent Document 4. First, a photocurable resin (acrylic resin) was applied over a work (PET film (100 μm thick)) using a syringe. Then, the surface of the moth-eye mold which underwent the mold release treatment according to the above-described method of Inventive Example 1 was pressed against the photocurable resin in vacuum such that the uneven structure of the moth-eye mold was filled with the photocurable resin. Thereafter, the photocurable resin in the uneven structure was irradiated with ultraviolet rays (365 nm, 1000 mW/cm$^2$) for 2 minutes, whereby the photocurable resin was cured. Then, the moth-eye mold was separated from the substrate, whereby the antireflection film was produced. Likewise, an antireflection film was produced using a moth-eye mold which underwent a mold release treatment according to the above-described method of Comparative Example 1.

Figure 3:
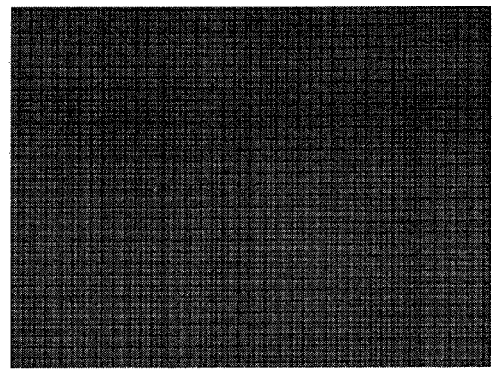
FIG. 3 (a) is a microscopic image of a surface of an antireflection film produced using a moth-eye mold which underwent a mold release treatment according to a mold release treatment method of Inventive Example 1. (b) is a microscopic image of a surface of an antireflection film produced using a moth-eye mold which underwent a mold release treatment according to a mold release treatment method of Comparative Example 1.
Figure 3:
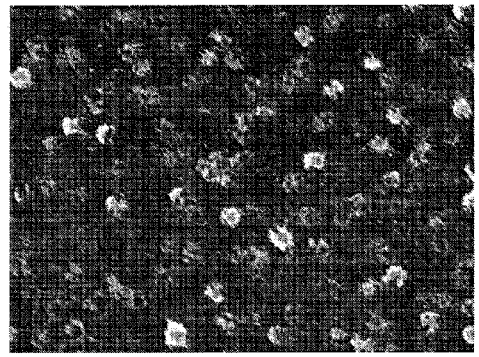

FIG. 3(*a*) is a microscopic image of a surface of an antireflection film produced using a moth-eye mold which underwent a mold release treatment according to the method of Inventive Example 1. FIG. 3(*b*) is a microscopic image of a surface of an antireflection film produced using a moth-eye mold which underwent a mold release treatment according to the method of Comparative Example 1. Note that the microscopic images shown in FIGS. 3(*a*) and 3(*b*) were photographed after a black resin plate (acrylic plate) was placed over the rear surface of the antireflection film.

As seen from FIG. 3(*b*), the surface of the antireflection film produced using the moth-eye mold which underwent a mold release treatment according to the method of Comparative Example 1 had a portion which appeared white. The two-dimensional size of the white portion when viewed in a direction normal to the surface was about 200 μm to 300 μm. The surface was examined using a scanning electron microscope (SEM), and a plurality of protrusions with a height of about 200 nm were found in the portion that appeared white. On the other hand, in the portion that appeared black, a plurality of protrusions with a height of about 400 nm were found. In the portion where a plurality of protrusions with a height of about 200 nm were found, the height of the plurality of protrusions was relatively low so that the reflection was not sufficiently prevented. Therefore, it is inferred that, the reflectance was higher so that it appeared white. One of the possible causes of formation of the relatively-low protrusions in part of the surface of the antireflection film is that, at the surface of the moth-eye mold, the fluoric compound segregated in some micropores of the surface of the moth-eye mold so that the depth of the micropores decreased, and when the moth-eye structure was transferred, low protrusions were formed in part of the surface of the work. It is also estimated that, when a mold release treatment was performed according to the mold release treatment method of Comparative Example 1, the fluoric compound did not sufficiently spread, so that the fluoric compound was not sufficiently present in some portions. In the portions where the fluoric compound was not sufficiently present so that the mold releasability was low, the photocurable resin was not successfully peeled off, so that there was a portion where a desired moth-eye structure was not formed.

On the other hand, as seen from FIG. 3(a), the surface of the antireflection film produced using the moth-eye mold of Inventive Example 1 did not have a white portion such as those detected in the antireflection film which was produced using the moth-eye mold of Comparative Example 1 (FIG. 3(b)). From this result, it is appreciated that the antireflection film produced using the moth-eye mold of Inventive Example 1 had a low reflectance over the entire surface. It is estimated that the low reflectance over the entire surface is attributed to the fact that a mold release treatment was provided without causing uneven application according to the mold release treatment method of Inventive Example 1, and accordingly, a desired moth-eye structure was formed over the entire surface of the antireflection film.

As described above, it was confirmed that, according to the mold release treatment method of the embodiment of the present invention, a mold release treatment can be provided without causing uneven application even when the spray coating method is employed in application of a mold releasing agent.

As for the moth-eye mold of Inventive Example 1, the transfer efficiency of the mold releasing agent was examined. The transfer efficiency, which herein refers to the ratio in percentage of the amount of the mold releasing agent adhering on the surface of the moth-eye mold to the amount of ejected mold releasing agent, was not less than 60%. On the other hand, the transfer efficiency of Comparative Example 1 was not more than 40%.

In the process of performing a mold release treatment by applying a mold releasing agent according to the spray coating method without performing the step of applying the solvent as in Comparative Example 1, the droplet size of the mold releasing agent was increased, and it was examined whether or not the above-described application unevenness was improved. In Comparative Example 1 where the mold releasing agent was applied without performing the step of applying the solvent, the solvent evaporated before the mold releasing agent droplets reached the moth-eye mold, so that the fluoric compound was not diffused. Thus, the present inventor attempted to improve the diffusability of the mold releasing agent by increasing the droplet size such that a larger portion of the solvent would be remaining when the droplets reached the moth-eye mold. However, according to this method, the droplets of the mold releasing agent ran down to gather at the lower part of the moth-eye mold so that uneven application occurred. Furthermore, the present inventor attempted to improve the uneven application by performing the application a larger number of times such that the film of the mold releasing agent had a greater thickness, but the effect was small. In both of the case where the droplet size was increased and the case where the application was performed a larger number of times, the transfer efficiency of the mold releasing agent deteriorated.

The moth-eye mold of Inventive Example 1 was further examined as to whether there was a foreign substance whose two-dimensional size was greater than 100 μm on the surface of the moth-eye mold after the mold release treatment. Upon observation with an optical microscope (of 100 magnifications), no foreign substance whose two-dimensional size was greater than 100 μm was detected. Note that, as described above, in Inventive Example 1, a two-fluid nozzle was used in the preparatory washing. When the preparatory washing was performed using a shower nozzle instead of the two-fluid nozzle, a large number of foreign substances were found on the surface after the mold release treatment. In other words, the shower nozzle exhibited a poor foreign substance removing effect. The moth-eye mold of Comparative Example 1 was also examined, and foreign substances were found on the surface of the moth-eye mold after the mold release treatment.

Figure 4:
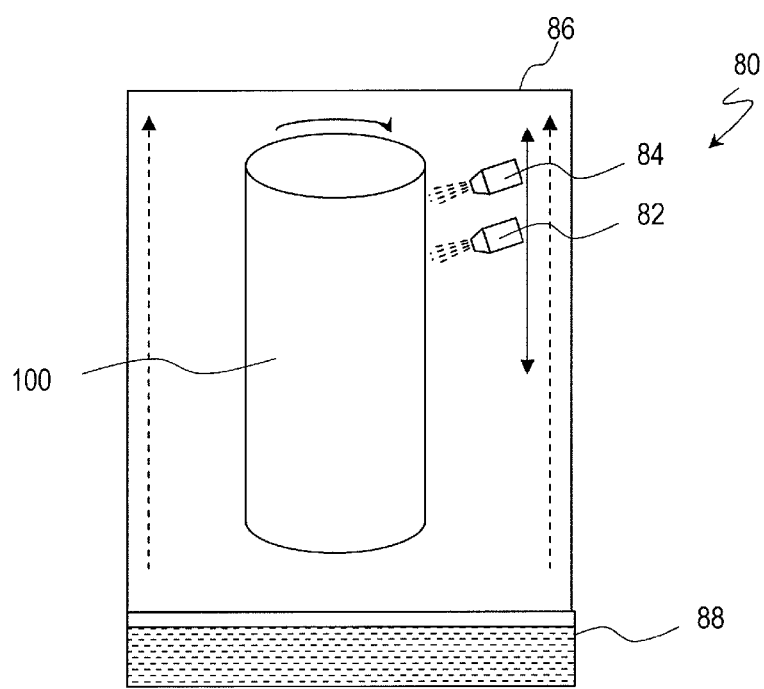
FIG. 4 (a) is a schematic diagram of a mold release treatment apparatus 80. (b) is a schematic diagram of a moth-eye mold 100 in the form of a roll, for illustrating a deviation of the long axis direction of the moth-eye mold 100 from the vertical direction.
Figure 4:
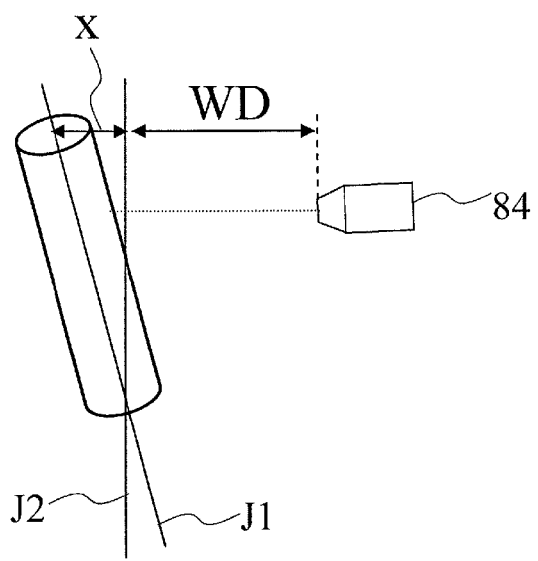

Then, a mold release treatment apparatus of an embodiment of the present invention is described with reference to FIG. 4(a). FIG. 4(a) is a schematic diagram of a mold release treatment apparatus 80. In an example described herein, a mold release treatment is performed on the moth-eye mold 100 in the form of a roll. As shown in FIG. 4(a), the mold release treatment apparatus 80 includes a solvent nozzle 82, a mold releasing agent nozzle 84, an application chamber 86, and a solvent bath 88. The solvent nozzle 82 and the mold releasing agent nozzle 84 are provided in the application chamber 86. The solvent nozzle 82 is provided at a lower level than the mold releasing agent nozzle 84 with a predetermined space therebetween. The solvent nozzle 82 and the mold releasing agent nozzle 84 are moved by an unshown lifting mechanism, for example, in the directions of solid arrows shown in FIG. 4(a) at identical velocities with the predetermined space maintained therebetween. The solvent nozzle 82 may be a spray nozzle, for example, and may eject a solvent that is capable of dissolving a fluoric compound which has mold releasability. The mold releasing agent nozzle 84 may be a spray nozzle for ejection of a mold releasing agent.

The solvent bath 88 stores the solvent that is capable of dissolving a fluoric compound which has mold releasability. The solvent bath 88 is provided at the bottom of the application chamber 86. The solvent in the solvent bath 88 evaporates to form an atmosphere of the solvent in the application chamber 86.

The moth-eye mold 100 is provided in the application chamber 86 such that the long axis direction of the moth-eye mold 100 is generally parallel to the direction of movement of the solvent nozzle 82 and the mold releasing agent nozzle 84. The solvent nozzle 82 and the mold releasing agent nozzle 84 move in the vertical direction, for example, and the moth-eye mold 100 is provided so as to stand upright such that the long axis direction is generally parallel to the vertical direction. The solvent is applied to the moth-eye mold 100 from the solvent nozzle 82 moving in the long axis direction of the moth-eye mold 100. In this step, the moth-eye mold 100 is rotated by an unshown rotation mechanism along the perimeter direction of the moth-eye mold 100. In this way, the solvent is applied over the entire perimeter surface of the moth-eye mold 100. Over part of the perimeter surface of the moth-eye mold 100 to which the solvent has been applied, the mold releasing agent is applied by the mold releasing agent nozzle 84. The mold releasing agent nozzle 84 moves parallel to the long axis of the moth-eye mold 100 as does the solvent nozzle 82. Meanwhile, the moth-eye mold 100 is rotated such that the mold releasing agent is applied over the entire perimeter surface.

When the treatment proceeds from the upper end to the lower end of the moth-eye mold 100, the mold releasing agent may be sprayed from the mold releasing agent nozzle 84 while the solvent is sprayed from the solvent nozzle 82. The solvent nozzle 82 and the mold releasing agent nozzle 84 move parallel to the long axis with a predetermined space. Note that, for example, each of the solvent nozzle 82 and the mold releasing agent nozzle 84 may be independently moved such that the mold releasing agent is applied after the solvent is applied.

For example, when the application of the solvent and the application of the mold releasing agent are performed on a moth-eye mold 100 in the form of a roll which has a diameter of 65 mm and a length of 370 mm, the distance between the solvent nozzle 82 and the mold releasing agent nozzle 84 is 70 mm. The solvent is applied for 180 seconds in each cycle, with a flow rate of 0.06 L/sec, an ejection angle of 30° and an ejection pressure of 0.2 MPa to 0.4 MPa. The mold releasing agent is applied with a flow rate of 0.008 L/sec, an ejection angle of 30°, an atomizing air ejection pressure of 0.4 MPa, and a pattern air ejection pressure of 0.3 MPa. When the application of the mold releasing agent is performed through three cycles, for example, the application duration of the mold releasing agent is 37 seconds in each cycle, and hence, the total application duration is 111 seconds. After the solvent is applied over the moth-eye mold 100, there is a 60 sec interval before the mold releasing agent is applied. When the solvent nozzle 82 and the mold releasing agent nozzle 84 are moved along the long axis direction with a predetermined space maintained therebetween such that the treatment proceeds from the upper end to the lower end of the moth-eye mold 100, the solvent nozzle 82 and the mold releasing agent nozzle 84 are moved downward at 10 cm/s with the predetermined space maintained therebetween. The moth-eye mold 100 is rotated at 60 rpm.

In the mold release treatment apparatus 80, the mold releasing agent is applied over the moth-eye mold 100 in the application chamber 86, and therefore, the mold releasing agent is applied in an atmosphere of the solvent. Therefore, as described above, the mold releasing agent readily spreads. Note that, for example, an upward flow is generated in the application chamber 86 as shown by broken arrows in FIG. 4(a), whereby an atmosphere of the solvent can be efficiently produced in the application chamber 86.

The spray nozzle used for applying the mold releasing agent may be, for example, a single-fluid nozzle or a two-fluid nozzle. By using a two-fluid nozzle, droplets of the mold releasing agent to be ejected can be atomized. Alternatively, a swirl nozzle may be used. By using a swirl nozzle, a spiral air flow can be generated, so that whirling droplets of the mold releasing agent can be applied over the surface of the moth-eye mold 100. Here, the shock which occurs when droplets of the mold releasing agent collide with the moth-eye mold 100 can be reduced, so that droplets which bounce back from the surface of the moth-eye mold 100 can be reduced. The present inventor used a two-fluid nozzle and a swirl nozzle to apply the mold releasing agent and compared the transfer efficiencies. The transfer efficiency of the two-fluid nozzle was 40-60%, and the transfer efficiency of the swirl nozzle was 20-40%. Therefore, the two-fluid nozzle is preferred from the viewpoint of the transfer efficiency. Note that, according to the researches conducted by the present inventor, the transfer efficiency of the swirl nozzle was improved to 60-80% by adjusting the environmental conditions (e.g., use of a high airtight design) or using an electrostatic coating method. The application of the mold releasing agent may be realized by an electrostatic spraying method. In either case of the two-fluid nozzle and the swirl nozzle, a filter may be provided at the tip of the nozzle to prevent ejection of a foreign substance contained in the mold releasing agent. Note that the spray nozzle used for applying the solvent may be a spray nozzle which is similar to that used for the application of the mold releasing agent.

In the mold release treatment apparatus 80 shown in FIG. 4(a), the moth-eye mold 100 in the form of a roll is provided so as to stand upright such that the long axis direction is generally parallel to the vertical direction, although the long axis direction of the moth-eye mold 100 in the form of a roll may be inclined from the vertical direction. The deviation of the long axis direction of the moth-eye mold 100 in the form of a roll from the vertical direction is described with reference to FIG. 4(b).

The deviation from the vertical direction was examined using a moth-eye mold 100 in the form of a roll with a diameter of 65 mm and a length of 345 mm under the conditions that the rotation speed of the moth-eye mold 100 was 60 rpm and the moving velocity of the nozzles was 10 mm/sec. The distance between the nozzle 84 and the moth-eye mold 100 (WD shown in FIG. 4(b)) was 70 mm. Note that, herein, as shown in FIG. 4(b), WD is the distance between the axis J2, passing through the center of the bottom surface of the moth-eye mold 100 and extending in the vertical direction, and the tip of the nozzle 84. The distance X between the central axis J1 of the moth-eye mold 100 and the axis J2 passing through the center of the bottom surface of the moth-eye mold 100 and extending in the vertical direction (the distance between the center of the top surface of the moth-eye mold 100 and the axis J2) was examined. When X>10 mm, uneven application of the mold releasing agent occurred. The distance WD was also examined. When WD<20 mm and WD>130 mm, uneven application of the mold releasing agent occurred. Therefore, in this case, it is preferred that X≤10 mm, and it is preferred that 20 mm≤WD≤130 mm.

As described below, performing the step of washing the moth-eye mold (FIG. 1(b)) before the application of the solvent improves the effect of the mold release treatment as compared with a case where the washing is not performed.

When the moth-eye mold which had undergone the anodization and the etching was left in the air for a long period of time before the mold release treatment was performed, the mold releasability was not sufficiently obtained in some cases. On the surface of the porous alumina layer after the anodization, a hydrous alumina, an aluminum-oxalic acid chelate, and an oxalate are present. When the moth-eye mold is left in the air, the substances present over the surface cause a reaction with moisture in the air so that an alumina hydrate or a carboxylic acid which is derived from an oxalate is formed. When a hydrate is formed at the surface of an anodic oxide film, the adhesion of the fluoric compound to the surface degrades. Therefore, it is estimated that after the mold release treatment is performed, the mold releasability cannot be sufficiently obtained.

As described below, the mold releasability was examined based on the contact angle for water of the surface of the moth-eye mold after the mold release treatment. When the moth-eye mold which had undergone the anodization and the etching was left in the air for a long period of time (longer than 48 hours) before the mold release treatment was performed, the contact angle of the surface after the mold release treatment was small as compared with a moth-eye mold on which the mold release treatment was performed within 48 hours after the anodization and the etching. When the mold release treatment was performed within one day after the anodization and the etching and thereafter the contact angle for water was measured, it was not less than 140°. On the other hand, when the moth-eye mold was left in the air for 3 days after the anodization and the etching and then underwent the mold release treatment, the contact angle for water was not more than 135°. Thus, the contact angle for water of the surface of the moth-eye mold that underwent the mold release treatment after being left in the air for 3 days was smaller than the contact angle for water of the surface of the moth-eye mold that underwent the mold release treatment within one day after the anodization and the etching. It is inferred that when a moth-eye mold is left in the air as described above, many hydrates are produced on the surface. It is inferred that the surface with the hydrates produced thereon exhibits poor adhesion of the fluoric compound, and therefore, when hydrates are produced, the contact angle of the surface for water after the mold release treatment decreases. The small contact angle of the surface after the mold release treatment means that the mold releasability is poor. In other words, when the contact angle of the surface after mold release treatment is small, the mold releasability cannot be sufficiently obtained. Therefore, when a moth-eye mold whose contact angle after the mold release treatment is small is used for production of an antireflection film, a desired moth-eye structure cannot be formed in some cases.

As described below, even when the moth-eye mold is left in the air for 2-23 days after the anodization and the etching, the contact angle for water of the surface of the moth-eye mold after the mold release treatment can be increased by washing the surface of the moth-eye mold before the solvent and the mold releasing agent are applied, as compared to a case where the washing is not performed.

The present inventor washed moth-eye mold samples according to different washing methods and examined the contact angle for water of the surface after the mold release treatment. Hereinafter, the experimental results of the examination are described. The washing methods examined herein include irradiation with excimer UV light, running-water washing with ultrapure water, immersion washing with reduced electrolytic ion water, immersion washing with acetone, and immersion washing with phosphoric acid.

As described below, the moth-eye mold samples were left in the air for 2 days or 23-24 days after being manufactured by the anodization and the etching. Thereafter, the moth-eye mold samples were washed and then subjected to a mold release treatment, and the contact angle for water of the surface after the mold release treatment was examined. According to the researches conducted by the present inventor, it was found that, during the period where a porous alumina layer was left in the air for one week or longer, almost all of a hydrous alumina, an aluminum-oxalic acid chelate, and an oxalate which were present on the surface caused a reaction with moisture in the air so that a hydrate was formed. The period where the moth-eye mold was left in the air was 23-24 days, such that almost all of the hydrous alumina and other substances mentioned above caused a reaction.

Firstly, a moth-eye mold was manufactured under the same anodization and etching conditions as those of Inventive Example 1.

The resultant moth-eye mold was left in the air for 2 days and then washed according to any of the aforementioned washing methods. Thereafter, drying, baking, application of the solvent, application of the mold releasing agent, baking, rinsing, drying and baking were performed in this order in the same way as described above in Inventive Example 1. In the case of a moth-eye mold sample which was washed by means of irradiation with excimer UV light, the step of drying the surface of the moth-eye mold after the washing and the step of baking were not performed.

Thereafter, the contact angle for water of the surface of the moth-eye mold was measured. The contact angle was measured using a portable contact angle meter manufactured by Kyowa Interface Science Co., Ltd.

Table 1 shows the contact angles of moth-eye molds $12e$, $12j$, $12k$, and $12r$, each of which was left in the air for days and then subjected to any of the aforementioned washing steps before the mold release treatment, and the contact angle of a moth-eye mold $12n$, which was subjected to the mold release treatment without undergoing any washing step. The moth-eye mold $12e$ was washed by irradiation with excimer UV (wavelength: 172 nm, 100 W, 150 sec). The excimer UV washing was performed using an excimer light irradiation unit manufactured by USHIO INC. The moth-eye mold $12j$ was subjected to running-water washing with ultrapure water (60 sec). The moth-eye mold $12k$ was immersed in reduced electrolytic ion water and then washed with pure water (30 sec). The moth-eye mold $12r$ was immersed in phosphoric acid (1 mol/L) and then washed with pure water (30 sec).

TABLE 1

| | 12e | 12j | 12k | 12r | 12n |
|---|---|---|---|---|---|
| contact angle (°) | 142.3 | 142.5 | 143.3 | 143.2 | 134.7 |

As seen from Table 1, the contact angle for water of the surface after the mold release treatment of the moth-eye mold $12n$, which was left in the air for 2 days and then subjected to the mold release treatment without undergoing any washing step, was 134.7°. On the other hand, by performing the mold release treatment after the washing step, the contact angle after the mold release treatment of the moth-eye molds $12e$, $12j$, $12k$, and $12r$ was not less than 140°. The washing step was performed in this way, so that the contact angles after the mold release treatment were higher than that of the moth-eye mold $12n$ which was subjected to the mold release treatment without undergoing any washing step. As described above, it is inferred that hydrates were produced on the surface of the moth-eye mold because the moth-eye mold was left in the air. However, it is inferred that, the hydrates were removed by performing the washing step, so that the contact angle after the mold release treatment exhibited a greater value.

It is also seen from Table 1 that, particularly, the moth-eye mold $12k$, which was washed with reduced electrolytic ion water, and the moth-eye mold $12r$, which was washed with phosphoric acid, exhibited large contact angle values after the mold release treatment. Therefore, it is appreciated that, particularly, by performing the washing with reduced electrolytic ion water and the washing with phosphoric acid, the effect of increasing the contact angle after the mold release treatment is achieved.

Table 2 shows the contact angles of five moth-eye mold samples $13e1$ to $13e5$ which were left in the air for 23 days and then subjected to excimer UV washing (100 W, 300 sec) before the mold release treatment. Note that, to examine the stability of the process, the moth-eye molds $13e1$ to $13e5$ were subjected to the washing and the mold release treatment under the same conditions.

TABLE 2

|  | 13e1 | 13e2 | 13e3 | 13e4 | 13e5 |
|---|---|---|---|---|---|
| contact angle (°) | 139.7 | 137.6 | 139.9 | 139.8 | 140.0 |

Table 3 shows the contact angles of seven moth-eye mold samples 13a1 to 13a7 which were left in the air for 23 days and then subjected to ultrasonic washing with acetone (160 kHz, 300 sec) and the mold release treatment. Note that, to examine the stability of the process, the moth-eye molds 13a1 to 13a7 were subjected to the washing and the mold release treatment under the same conditions. Table 3 also shows the contact angle of a moth-eye mold 13j which was left in the air for 23 days before being subjected to the running-water washing with ultrapure water and the mold release treatment, and the contact angle of a moth-eye mold 13n which was subjected to the mold release treatment without undergoing any washing step.

TABLE 3

|  | 13a1 | 13a2 | 13a3 | 13a4 | 13a5 | 13a6 | 13a7 | 13j | 13n |
|---|---|---|---|---|---|---|---|---|---|
| contact angle (°) | 136.6 | 136.4 | 137.2 | 135.7 | 138.8 | 127.7 | 138.2 | 140.6 | 134.4 |

The contact angle after the mold release treatment of the moth-eye mold 13n (Table 3), which was subjected to the mold release treatment after being left in the air for 23 days without undergoing any washing step, was 134.4°. As seen from Table 2 and Table 3, among the moth-eye molds 13e1 to 13e5 which were subjected to the mold release treatment after being subjected to the excimer UV washing, the moth-eye molds 13a1 to 13a7 which were subjected to the mold release treatment after being degreased with acetone, and the moth-eye mold 13j which was subjected to the mold release treatment after being subjected to running-water washing with ultrapure water, the moth-eye mold 13a6 exhibited a smaller contact angle for water of the surface after the mold release treatment than the moth-eye mold 13n that was subjected to the mold release treatment without undergoing any washing step. The other moth-eye mold samples than the moth-eye mold 13a6 exhibited larger contact angles for water of the surface after the mold release treatment than the moth-eye mold 13n. The moth-eye mold 13j, which was subjected to running-water washing with ultrapure water after being left in the air for 23 days, exhibited the largest contact angle after the mold release treatment. The excimer UV washing and the washing with acetone mainly remove organic substances. It is inferred that the running-water washing with ultrapure water effectively removed foreign substances other than the organic substances, and therefore, the contact angle after the mold release treatment was large.

As seen from Table 2, the moth-eye molds 13e1 to 13e5, which were obtained by performing the excimer UV washing on a moth-eye mold that was left in the air for 23 days, exhibited larger contact angles for water after the mold release treatment, by about 3° or more, than the moth-eye mold 13n which was subjected to the mold release treatment without undergoing any washing step. On the other hand, among the moth-eye molds 13a1 to 13a7 (Table 3) which were subjected to the mold release treatment after being washed with acetone as described above, the moth-eye molds 13a1, 13a2, 13a3, 13a4, 13a5 and 13a7 exhibited larger contact angles than the moth-eye mold 13n. However, the contact angle of the moth-eye mold 13a6 was smaller than that of the moth-eye mold 13n which was subjected to the mold release treatment without undergoing any washing step. Comparing the washing with acetone and the excimer UV washing, the moth-eye molds 13e1 to 13e5 that were subjected to the excimer UV washing, excluding the moth-eye mold 13e2, exhibited larger contact angles than the contact angles after the mold release treatment of the moth-eye molds 13a1 to 13a7 that were washed with acetone. Thus, by performing the excimer UV washing, the contact angle after the mold release treatment can be large as compared with the moth-eye molds washed with acetone. Further, in the case of the washing with acetone, a variation of the contact angle after the mold release treatment was large as compared with the excimer UV washing. Therefore, comparing the washing with acetone and the excimer UV washing, the excimer UV washing provides higher process stability. It is appreciated from these results that the excimer UV washing is advantageous over the washing with acetone.

Table 4 shows the contact angles for water after the mold release treatment of a moth-eye mold 14e on which the excimer UV washing was performed for 150 sec after being left in the air for 24 days, a moth-eye mold 14j on which the running-water washing was performed with ultrapure water for 60 sec after being left in the air for 24 days, a moth-eye mold 14k which was washed with reduced electrolytic ion water for 30 sec after being left in the air for 24 days, and a moth-eye mold 14r which was washed with phosphoric acid for 30 sec after being left in the air for 24 days.

TABLE 4

|  | 14e | 14j | 14k | 14r |
|---|---|---|---|---|
| contact angle (°) | 134.0 | 135.1 | 137.8 | 136.4 |

The contact angle after the mold release treatment of the moth-eye mold 14e on which the excimer UV washing was performed after being left in the air for 24 days (Table 4) was smaller than that of the moth-eye mold 12e on which the excimer UV washing was performed after being left in the air for 2 days (Table 1) and those of the moth-eye molds 13e1 to 13e5 on which the excimer UV washing was performed after being left in the air for 23 days (Table 2). The moth-eye mold 14j that was washed with ultrapure water after being left in the air for 24 days, the moth-eye mold 14k that was washed with reduced electrolytic ion water after being left in the air for 24 days, and the moth-eye mold 14r that was washed with phosphoric acid after being left in the air for 24 days also exhibited smaller contact angles than the moth-eye molds that were left in the air for 2 days or the moth-eye molds that were left in the air for 23 days (Tables 1, 3 and 4). When being left in the air for 24 days, the effect of increasing the contact angle after the mold release treatment, which is achieved by washing, was small (Table 4) as compared with a case where a moth-eye mold was left in the air for 2 days (Table 1) or 23 days (Table 2 and Table 3). Note that, comparing the excimer UV washing (14e), the washing with ultrapure water (14j), the washing with reduced electrolytic ion water (14k), and the washing with phosphoric acid (14r), the contact angle after the mold release treatment was largest when the washing with reduced electrolytic ion water was performed.

Thus, it was found from the results of Table 1 that, from the viewpoint of increasing the contact angle after the mold release treatment, i.e., improving the effect of the mold release treatment, the washing with reduced electrolytic ion water and the washing with phosphoric acid are particularly preferred. It was also found from the results of Table 2 and Table 3 that, in the case where a moth-eye mold is left in the air for 23 days, comparing the excimer UV washing, the degreasing with acetone, and the running-water washing with ultrapure water, the running-water washing with ultrapure water achieves a greatest improvement in the effect of the mold release treatment. Note that, comparing the excimer UV washing and the washing with acetone, it was found that the excimer UV washing is advantageous because the effect of increasing the contact angle is stably achieved.

As seen from the above, even when the mold release treatment is not performed within, for example, 48 hours after the anodization and the etching have been performed, the contact angle of the surface of the moth-eye mold after the mold release treatment can be increased by washing a moth-eye mold before the solvent and the mold releasing agent are applied. In other words, the effect of the mold release treatment can be improved by washing a moth-eye mold before the solvent and the mold releasing agent are applied. Note that, particularly, when the period where a moth-eye mold is left in the air is not more than 23 days, the effect of the mold release treatment can be improved by washing the moth-eye mold.

The reduced electrolytic ion water may be, for example, a mixture of alkali ion water of pH 12 or larger and a monohydric, dihydric or trihydric alcohol of less than 60 weight %. The reduced electrolytic ion water used may be a safe reduced high-function ion cleaning water SK Cleaner manufactured by Yodogawa Hu-Tech Co., Ltd. The reduced electrolytic ion water has both the peeling power that the alkali ion water has and the degreasing power that the alcohol has, and therefore provides high detergency. The alkali ion water contains many negative ions, and positively ionizes dirt on the surface of a substrate (here, the moth-eye mold). The alkali ion water also covers the surface of the dirt and the surface of the substrate. The dirt and the surface of the substrate are separated by electric repulsion, so that the dirt can be removed. The above-described alkali ion water may be, for example, produced by electrolysis of an electrolytic aqueous solution which is made of saline and other mineral ingredients.

Now, the results of the examination of the effect of removing a foreign substance adhering on the moth-eye mold 100 are described. Here, microscopic images of foreign substances adhering on the surface of the moth-eye mold 100 are shown in FIGS. 5(a) to 5(d). The foreign substances shown in FIGS. 5(a) to 5(d) were detected on a surface of a moth-eye mold which was manufactured under the same conditions as those of Inventive Example 1 which have been previously described. The foreign substance shown in FIG. 5(a) may be an inorganic substance, such as glass. 23 pieces of such a type of foreign substances were detected in a 10 cm×10 cm area of the moth-eye mold. Note that, as the amount of foreign substances, the amount of substances which have a size of not less than 100 µm² was measured using a line sensor camera SuFi74 manufactured by NIPPON ELECTRO-SENSORY DEVICES Co., Ltd. The foreign substances shown in FIG. 5(b) may be organic overlying foreign substances, such as floating dusts. 18 pieces of such a type of foreign substances were detected in a 10 cm×10 cm area. The foreign substance shown in FIG. 5(c) may be a fiber-like foreign substance which is derived from fiber of cloth, hair, mold, etc. 5 pieces of such a type of foreign substances which were not less than 200 µm in length were detected in a 10 cm×10 cm area. The foreign substance shown in FIG. 5(d) may be an organic adhering substance, such as saliva, oil of a finger, a floating mist, etc. 19 pieces of such a type of foreign substances were detected in a 10 cm×10 cm area.

The effect of removing foreign substances was examined by performing shower washing of a moth-eye mold of cm×10 cm using a two-fluid nozzle which has a slit for ejection of air and pure water. The moth-eye mold was manufactured, using a base prepared by depositing an aluminum film on a substrate of 10 cm×10 cm, according to the same method as that of Inventive Example 1 which has been previously described. Each of the air pressure and the water pressure was 0.4 MPa. The moving velocity of the two-fluid nozzle was 3.6 m/min. The number of foreign substances was counted before and after the washing step using a line sensor camera SuFi74 manufactured by NIPPON ELECTRO-SENSORY DEVICES Co., Ltd. The resolution of the line sensor was 30 µm. The moving velocity of the line sensor was 11 m/min. The results are shown in Table 5. As shown in Table 5, for each of the inorganic foreign substance and the organic foreign substance, the detected substances were sorted by size into four ranges, and the counts of the ranges were examined.

TABLE 5

|  | Two-dimensional size | Before washing | After washing |
| --- | --- | --- | --- |
| Inorganic foreign substance | not less than 150 µm | 22 | 18 |
|  | not less than 100 µm and less than 150 µm | 46 | 26 |
|  | not less than 50 µm and less than 100 µm | 23 | 7 |
|  | not less than 30 µm and less than 50 µm | 19 | 5 |
| Organic foreign substance | not less than 150 µm | 1 | 1 |
|  | not less than 100 µm and less than 150 µm | 4 | 1 |
|  | not less than 50 µm and less than 100 µm | 0 | 0 |
|  | not less than 30 µm and less than 50 µm | 0 | 0 |
|  | Total | 115 | 58 |

As seen from Table 5, the amount of foreign substances whose two-dimensional size was not less than 30 µm was decreased from 115 counts to 58 counts. Particularly, inorganic foreign substances whose two-dimensional size was not less than 30 µm and less than 100 µm and organic foreign substances whose two-dimensional size was not less than 100 µm and less than 150 µm were reduced to a half or less.

Figure 5:
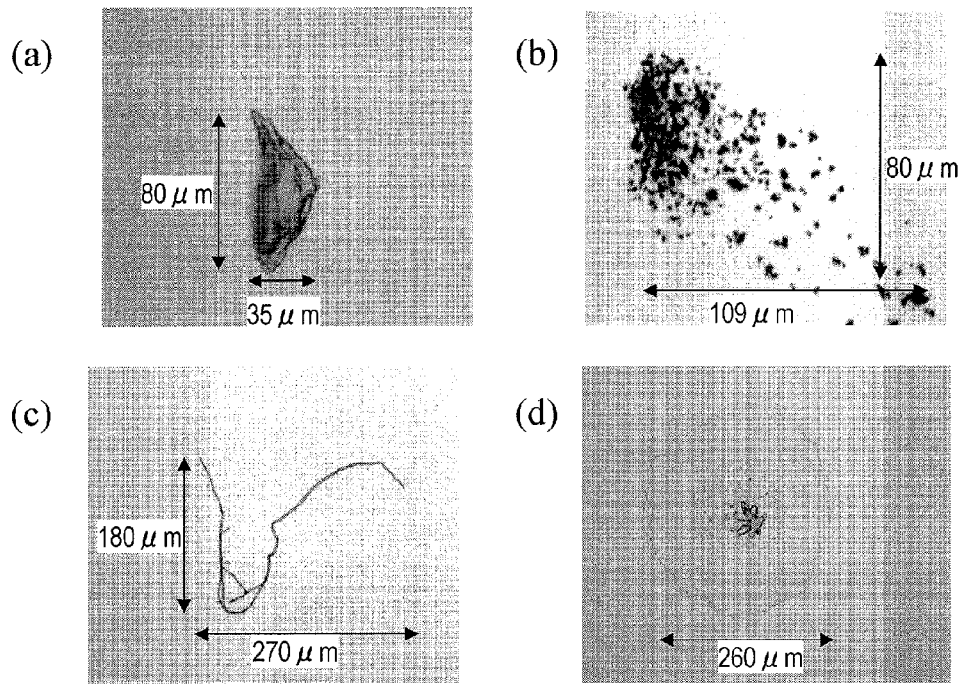
FIGS. 5 (a) to (d) are microscopic images of foreign substances adhering on a surface of a moth-eye mold.

The effect of removing foreign substances such as exemplified in FIG. 5 was examined. Inorganic foreign substances (e.g., FIG. 5(a)) were almost entirely removed. On the other hand, some of organic foreign substances were not sufficiently removed. Fiber-like foreign substances (e.g., FIG. 5(c)) were almost entirely removed. On the other hand, some of organic overlying foreign substances, such as floating dusts, and organic adhering substances, such as saliva, oil of a finger, a floating mist, were not entirely removed.

Figure 6:
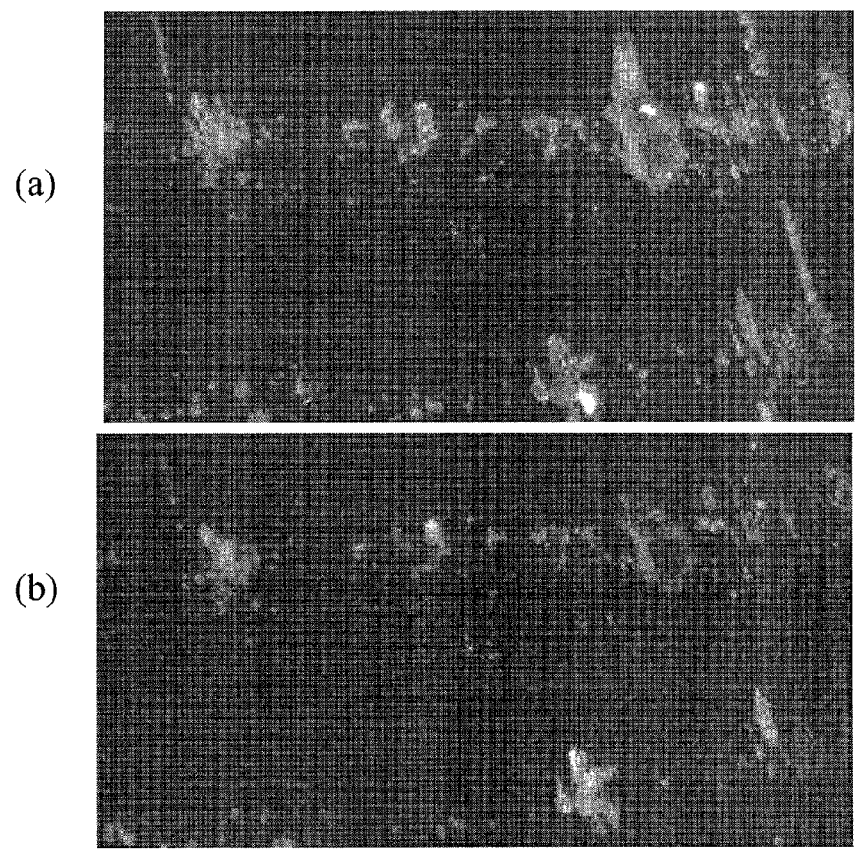
FIGS. 6 (a) and (b) are microscopic images of a surface of a moth-eye mold before washing and after washing, respectively.

FIG. 6 shows microscopic images of part of the surface of the moth-eye mold on which a foreign substance derived from oil of a finger is present. FIG. 6(a) shows a state of the surface before the washing step. FIG. 6(b) shows a state of the surface after the washing step, showing the same part as that shown in FIG. 6(a). In FIGS. 6(a) and 6(b), part of the image which appears white represents adhering oil. In comparison to FIG. 6(a), part of the image of FIG. 6(b) which appears white is faded. As seen from FIG. 6, oil was partially removed by washing, but was not completely removed by washing. The same also applies to foreign substances such as floating dusts (e.g., FIG. 5(b)). Some of the floating dusts were successfully removed, while other floating dusts were not removed although they were made thinner.

Figure 7:
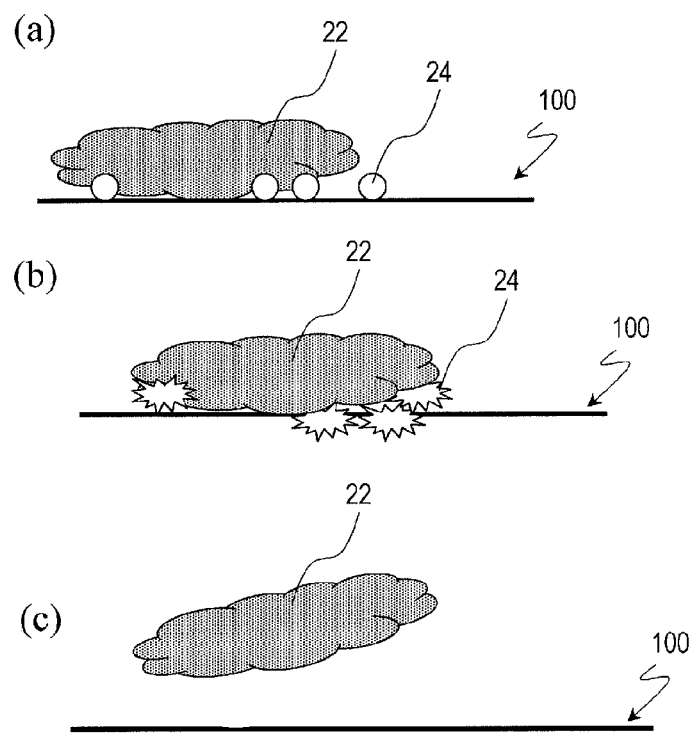
FIGS. 7 (a) to (c) are schematic diagrams for illustrating a function of removing a foreign substance with the use of ozone nanobubble water.

The organic foreign substances can be removed by, for example, irradiating a moth-eye mold which is kept immersed in ozone nanobubble water with UV light. The ozone nanobubble water may be an aqueous solution which contains ozone bubbles whose diameter is not more than 1 μm, for example, and has the function of removing organic substances (see, for example, Japanese Patent No. 4080440). The ozone nanobubble water is available from, for example, Showa Yakuhin Kougyou Co., Ltd. The function of removing foreign substances using the ozone nanobubble water is described with reference to FIG. 7. When the moth-eye mold 100 is immersed in the ozone nanobubble water, ozone nanobubbles 24 enter between a foreign substance 22 and the moth-eye mold 100 as shown in FIG. 7(a). Then, by irradiation of UV (e.g., 365 nm), the ozone nanobubbles 24 are burst (FIG. 7(b)). The shock caused by the burst of the ozone nanobubbles separates the foreign substance 22 from the moth-eye mold 100 (FIG. 7(c)).

The effect of removing inorganic foreign substances and organic foreign substances according to the washing methods other than the shower washing with a two-fluid nozzle was examined. The washing methods examined herein include ultrasonic washing with pure water, ultrasonic washing with reduced electrolytic ion water, phosphoric acid washing, and single-fluid shower washing with ultrapure water. The effect of removing foreign substances was examined by measuring the amount of adhering substances before and after the washing steps, using a line sensor camera which is similar to that mentioned above. The inorganic foreign substances such as shown in FIG. 5(a) were removed by the ultrasonic washing with reduced electrolytic ion water, the phosphoric acid washing, and the single-fluid shower washing with ultrapure water. These three methods exhibited generally equal effects of removing foreign substances. Some of the organic foreign substances were difficult to remove no matter which washing method was used. Of the organic foreign substances, fiber-like foreign substances were almost entirely removed as in the case of the above-described shower washing with a two-fluid nozzle. Note that, as in the above-described example, by irradiating a moth-eye mold which is kept immersed in ozone nanobubble water with UV light, the aforementioned organic foreign substances can be effectively removed.

Next, an example of a mold release treatment apparatus of an embodiment of the present invention is described with reference to FIG. 8 and FIG. 9. Note that, herein also, the description is provided with an example of an apparatus for performing a mold release treatment on the moth-eye mold 100 in the form of a roll.

Figure 8:
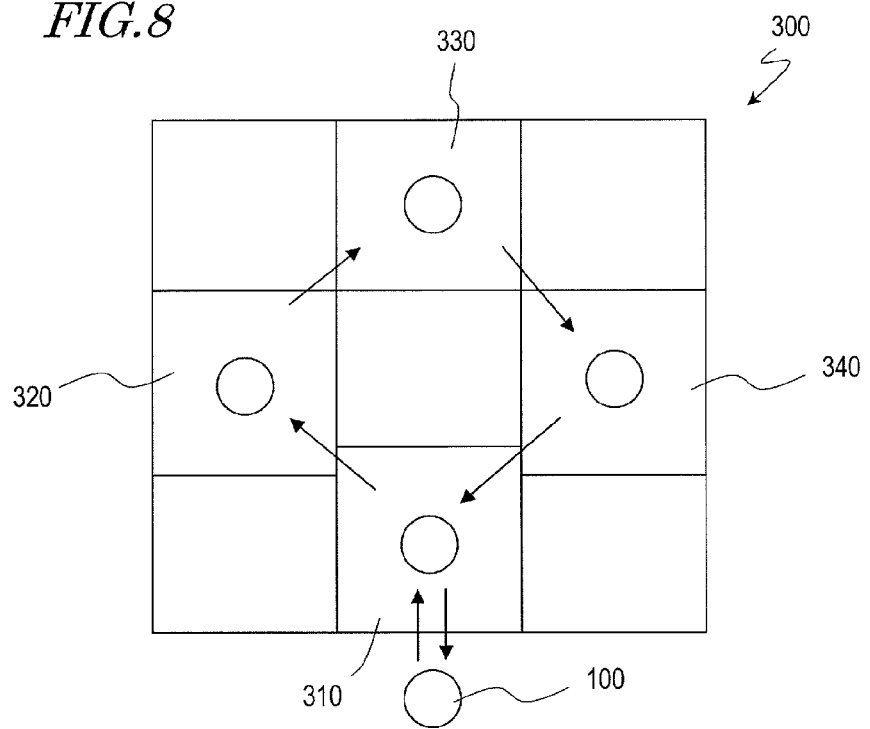
FIG. 8 A schematic diagram of a mold release treatment apparatus 300.

FIG. 8 is a schematic top view of a mold release treatment apparatus 300 of an embodiment of the present invention. As shown in FIG. 8, the mold release treatment apparatus 300 includes an inlet/outlet section 310, a preparatory washing section 320, a coating treatment section 330, and an inspection section 340. The preparatory washing section 320 is configured to wash and dry the moth-eye mold 100. The coating treatment section 330 is configured to sequentially perform application of the solvent, application of the mold releasing agent, baking, rinsing, drying after the rinsing, and baking on the moth-eye mold 100. The inspection section 340 is configured to inspect the moth-eye mold 100. After being sent in the inlet/outlet section 310, the moth-eye mold 100 is carried through the preparatory washing section 320, the coating treatment section 330, the inspection section 340, and the inlet/outlet section 310, in this order, in the mold release treatment apparatus 300. The mold release treatment apparatus 300 further includes, for example, a slider for carrying the moth-eye mold 100. The moth-eye mold 100 is then sent out from the inlet/outlet section 310 and is used for production of an antireflection film, for example.

Hereinafter, a specific configuration example of the preparatory washing section 320, the coating treatment section 330, and the inspection section 340 is described with reference to FIGS. 9(a) to 9(c). FIGS. 9(a), 9(b) and 9(c) are diagrams schematically showing the preparatory washing section 320, the coating treatment section 330 and the inspection section 340, respectively.

As shown in FIG. 9(a), the preparatory washing section 320 includes a shower nozzle 62a for applying a washing solution, an air knife 64a, a shower nozzle 62a, and a lifting mechanism 72 for lifting up and down the air knife 64a. Firstly, the moth-eye mold 100 is suspended by a suspender mechanism 74 provided to a slider 70 and carried from the inlet/outlet section 310 into the preparatory washing section 320. The lower part of the suspender mechanism 74 is provided with a rotation mechanism 71. The moth-eye mold 100 is washed with a washing solution ejected from the shower nozzle 62a which is moved by the lifting mechanism 72 along the long axis direction of the moth-eye mold 100. Meanwhile, the moth-eye mold 100 is rotated by the rotation mechanism 71 such that the washing solution is applied over the entire perimeter surface of the moth-eye mold 100. Then, the air knife 64a moving along the long axis direction of the moth-eye mold 100 blows compressed air against the surface of the moth-eye mold 100, thereby drying the surface of the moth-eye mold 100. Meanwhile, the moth-eye mold 100 is rotated by the rotation mechanism 71 such that the compressed air is blown against the entire perimeter surface of the moth-eye mold 100.

For example, in the case of washing and drying a moth-eye mold 100 in the form of a roll which has a diameter of 65 mm and a length of 370 mm, the distance between the shower nozzle 62a and the air knife 64a is 100 mm. After the washing solution is applied over the moth-eye mold 100, there is a 10 sec interval before the compressed air is supplied by the air knife 64a. When the treatment is performed from the upper end to the lower end of the moth-eye mold 100, the compressed air may be blown against the moth-eye mold 100 from the air knife 64a while the washing solution is supplied from the shower nozzle 62a. The shower nozzle 62a and the air knife 64a move parallel to the long axis of the moth-eye mold 100 while being kept separate from each other by a predetermined space. For example, the shower nozzle 62a and the air knife 64a are moved downward at 1.0 cm/sec while being kept separate from each other by a predetermined space. Meanwhile, the moth-eye mold 100 is rotated at 10 rpm.

As shown in FIG. 9(b), the coating treatment section 330 includes a spray nozzle 52 for applying the solvent over the surface of the moth-eye mold 100, a spray nozzle 54 for applying the mold releasing agent, a shower nozzle 62b, an air knife 64b, a lifting mechanism 72 for lifting up and down these elements, a heater 66, and a rinse solution container 76. The rinse solution container 76 stores a rinse solution which is to be supplied to the shower nozzle 62b. First, the moth-eye mold 100 is carried into the coating treatment section 330 by the slider 70. The coating treatment section 330 performs application of the solvent and application of the mold releasing agent as described above while rotating the moth-eye mold 100 and moving the spray nozzle 52 and the spray nozzle 54 along the long axis direction of the moth-eye mold 100. Then, a baking process is performed using the heater 66. Note that, in the above-described example of the mold release treatment apparatus 80 (FIG. 4(*a*)), the solvent nozzle 82 and the mold releasing agent nozzle 84 are moved in parallel. However, in the coating treatment section 330, the spray nozzle 52 and the spray nozzle 54 may be independently moved using different lifting mechanisms. Then, the rinse solution is applied over the surface of the moth-eye mold 100 using the shower nozzle 62*b*, whereby the surface is rinsed. Thereafter, the air knife 64*b* blows compressed air, for example, whereby the moth-eye mold 100 is dried. Thereafter, the baking process is performed using the heater 66. In the coating treatment section 330, a filter may be provided in the rinse solution container 76 for filtering the rinse solution, such that the rinse solution can be circulated for reuse.

For example, in the case of performing a coating treatment on a moth-eye mold 100 in the form of a roll which has a diameter of about 65 mm and a length of 370 mm such as described above, the solvent is first applied over the entire perimeter surface of the moth-eye mold 100 using the spray nozzle 52, and after passage of a 60 second interval, the mold releasing agent is applied by the spray nozzle 54. The solvent may be applied under the conditions that the flow rate is 0.06 L/sec, the ejection angle is 30°, the ejection pressure is 0.2-0.4 MPa, and the duration of one cycle is 180 seconds. The mold releasing agent may be applied under the conditions that the flow rate is 0.008 L/sec, the ejection angle is 30°, the atomizing air ejection pressure is 0.4 MPa, and the pattern air ejection pressure is 0.3 MPa. When the application of the mold releasing agent is performed through three cycles, for example, the application duration of the mold releasing agent is 37 seconds in each cycle, and hence, the total application duration is 111 seconds.

In the example described herein, the spray nozzle 52 and the spray nozzle 54 are independently moved. However, the spray nozzle 52 and the spray nozzle 54 may be moved together with a predetermined space maintained therebetween. In this case, the spray nozzle 52 and the spray nozzle 54 may be moved at 10 cm/s, for example.

The distance between the shower nozzle 62*b* and the air knife 64*b* may be, for example, 100 mm. After the rinse solution is applied over the moth-eye mold 100, there is a 10 sec interval before the compressed air is supplied by the air knife 64*b*. The shower nozzle 62*b* and the air knife 64*b* are moved downward at 1.0 cm/s while being kept separate from each other by a predetermined space.

Figure 9:
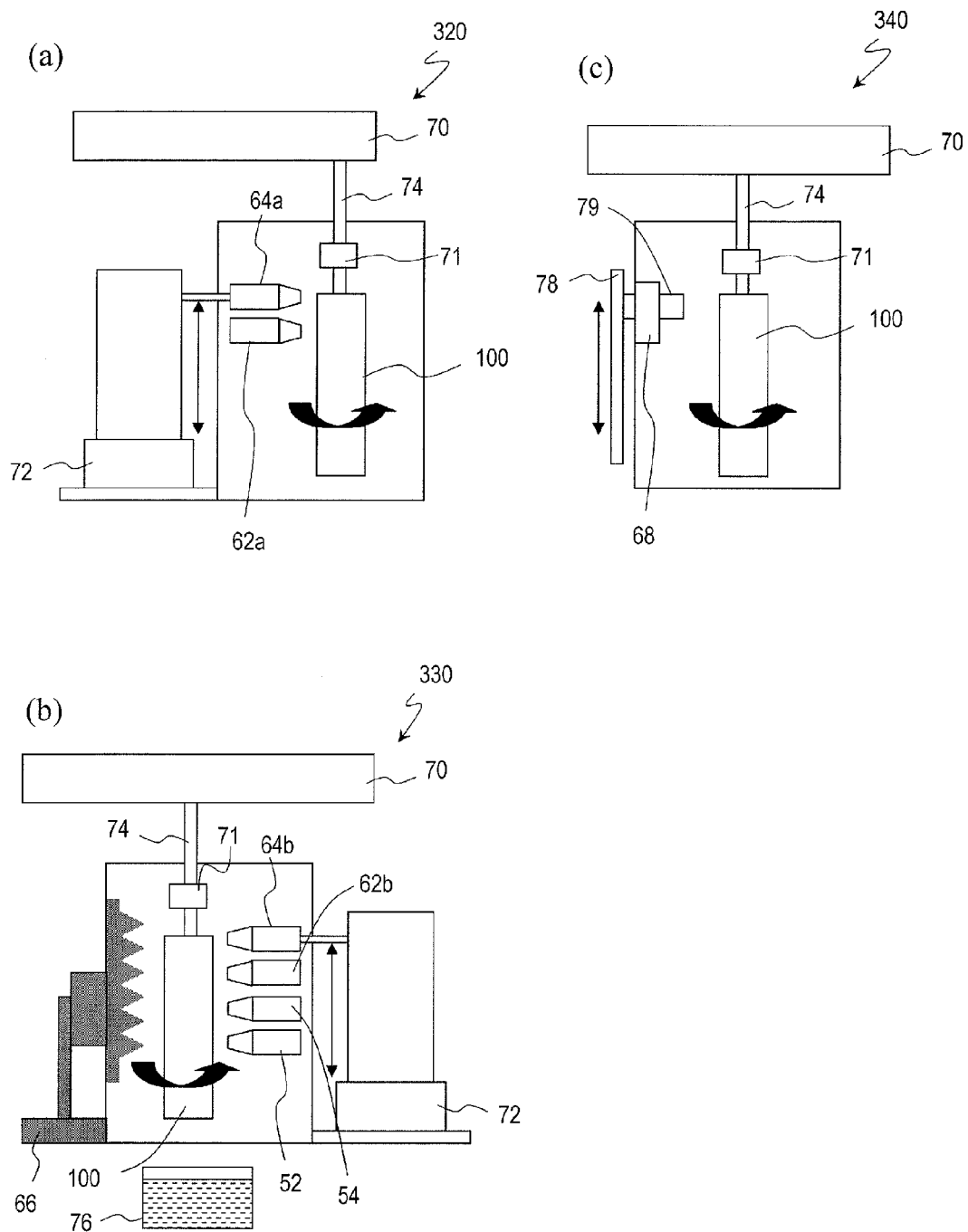
FIG. 9 (a) is a schematic diagram of a preparatory washing section 320. (b) is a schematic diagram of a coating treatment section 330. (c) is a schematic diagram of an inspection section 340.

As shown in FIG. 9(*c*), the inspection section 340 includes an illuminator 68, a camera 79, and a lifting mechanism 78 for lifting up and down the illuminator 68 and the camera 79. In the inspection section 340, the moth-eye mold 100 carried into the inspection section 340 by the slider 70 is rotated for inspection over the entire perimeter surface of the moth-eye mold 100 with the use of the illuminator 68 and the camera 79 moving along the long axis direction of the moth-eye mold 100. In the inspection section 340, for example, the perimeter surface of the moth-eye mold 100 is irradiated by the illuminator 68 and inspected by the camera 79 for adhering foreign substances.

For example, in the case of inspecting a moth-eye mold 100 in the form of a roll which has a diameter of about 65 mm and a length of 370 mm such as described above, the illuminator 68 and the camera 79 are moved downward at 1.0 cm/s, and the moth-eye mold 100 is rotated at 10 rpm.

Figure 10:
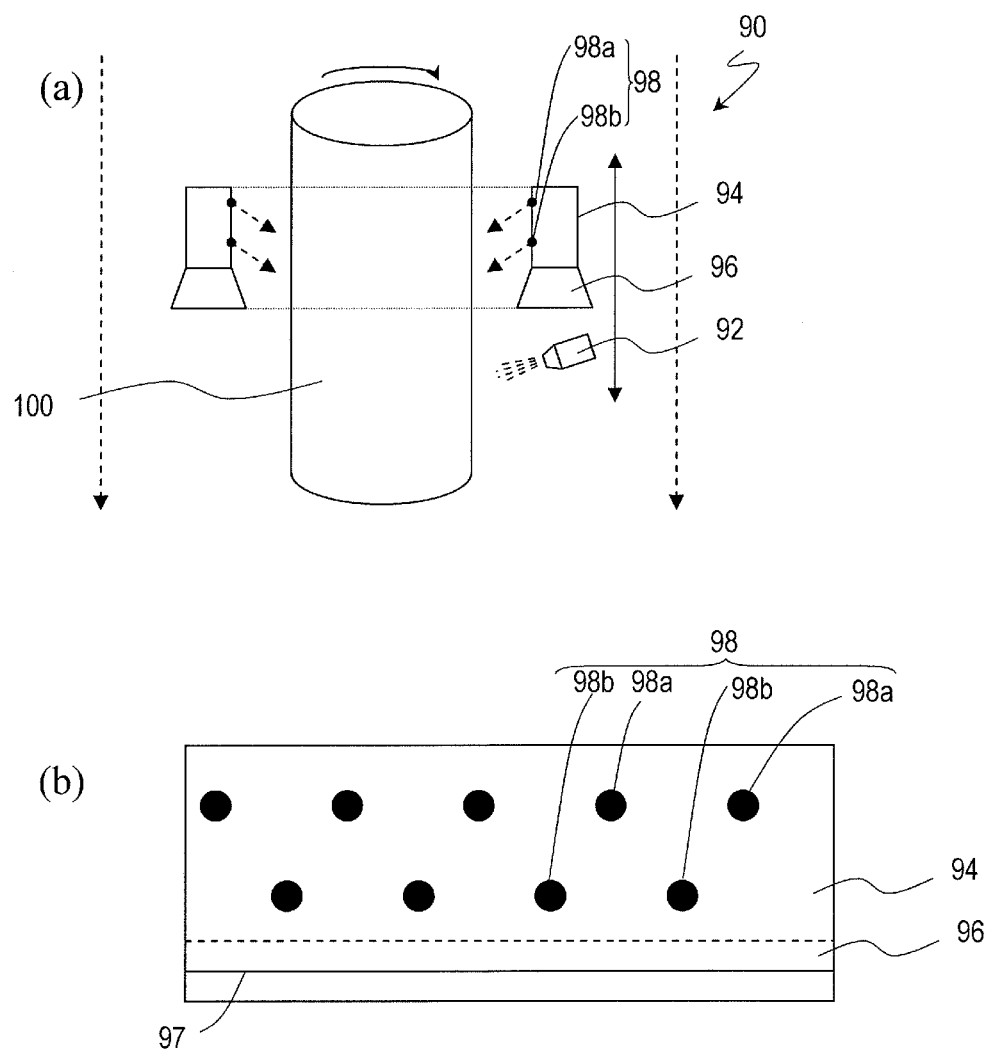
FIG. 10 (a) is a schematic diagram of a washing/drying apparatus 90. (b) is a diagram schematically showing an inner perimeter surface of a gas blowing section 94 and a projection section 96.

Next, a washing/drying apparatus for washing and drying the moth-eye mold before application of the mold releasing agent is described with reference to FIG. 10. FIG. 10(*a*) is a schematic diagram of a washing/drying apparatus 90. FIG. 10(*b*) is a diagram schematically showing the inner perimeter surface of a gas blowing section 94 and a projection section 96 of the washing/drying apparatus 90.

As shown in FIG. 10(*a*), the washing/drying apparatus 90 includes a washing nozzle 92 and a gas blowing section 94. The washing nozzle 92 may be, for example, a spray nozzle for ejecting a washing solution. The gas blowing section 94 has a plurality of ejection holes 98. The gas blowing section 94 is in the form of a ring, for example. The diameter of the inner perimeter surface of the gas blowing section 94 is greater than the diameter of the perimeter surface of the moth-eye mold 100 in the form of a roll. It is preferred that the washing/drying apparatus 90 further includes a projection section 96 as shown in FIG. 10(*a*). The projection section 96 is provided between the washing nozzle 92 and the gas blowing section 94. The projection section 96 is extending from a surface of the gas blowing section 94 which has the ejection holes 98 toward the perimeter surface of the moth-eye mold 100. For example, as shown in FIG. 10(*a*), the gas blowing section 94 and the projection section 96 are integrally formed. The projection section 96 is in the form of a ring and has a shape extending inward relative to the inner perimeter surface of the gas blowing section 94. It is preferred that the projection section 96 has a hole 97 for taking in a floating mist as shown in FIG. 10(*b*). The hole 97 for taking in a floating mist may be, for example, a hole in the form of a slit which is provided in the inner perimeter surface of the projection section 96 as shown in FIG. 10(*b*).

The washing nozzle 92 ejects the washing solution while descending along the long axis direction of the moth-eye mold 100. Meanwhile, the moth-eye mold 100 is rotated by an unshown rotation mechanism such that the entire perimeter surface of the moth-eye mold 100 can be washed. The gas blowing section 94 ejects a nitrogen gas from the plurality of ejection holes 98 while descending, for example, for drying part of the surface over which the washing solution has been applied. In the washing/drying apparatus 90, the projection section 96 extending inward relative to the inner perimeter surface of the gas blowing section 94 is provided, and therefore, droplets of the washing solution ejected from the washing nozzle 92 are prevented from floating toward the gas blowing section 94 side.

By providing the hole 97 in the inner perimeter surface of the projection section 96 for taking in a floating mist as shown in FIG. 10(*b*), a floating mist which would be generated by blowing of a gas by the gas blowing section 94, for example, can be prevented from adhering onto the moth-eye mold 100. In the projection section 96, for example, an unshown intake fan is provided for taking a floating mist into the hole 97. Note that the gas blowing section 94 and the projection section 96 have the form of a ring and are provided around the perimeter surface of the moth-eye mold 100 in the form of a roll. Therefore, drying of the moth-eye mold 100 and prevention of adhesion of a floating mist can be efficiently achieved. In the washing/drying apparatus 90, a downward flow is generated as shown by broken arrows in FIG. 10(*a*), so that the floating of a mist can be effectively prevented.

In the washing/drying apparatus 90, the gas blowing section 94 is moved vertically downward while the moth-eye mold 100 is rotated, whereby a spiral gas stream flowing vertically downward is blown against the perimeter surface of the moth-eye mold 100. As a result, droplets of the washing solution can be blown away vertically downward.

The plurality of ejection holes 98 of the gas blowing section 94 are arranged in different rows. Specifically, as shown in FIG. 10(*b*), the plurality of ejection holes 98 include first ejection holes 98*a* and second ejection holes 98*b* which are at different levels. The first ejection holes 98*a* are arranged at a vertically higher level than the second ejection holes 98b. The first ejection holes 98a and the second ejection holes 98b are alternately arranged in the inner perimeter surface of the gas blowing section 94 as shown in FIG. 10(b). For example, in the case where the gas blowing section 94 has an air knife which is provided around the perimeter of a moth-eye mold in the form or a roll instead of the plurality of ejection holes 98, droplets which are blown vertically upward by a gas ejected from the air knife are likely to adhere onto the mold again. The droplets blown upward are barred by a sheet-like gaseous curtain that is formed by the gas ejected from the air knife from moving vertically downward and may adhere onto the mold again. Particularly, when the moving velocity of the gas blowing section is relatively fast, readherence of droplets readily occurs. When the first ejection holes 98a and the second ejection holes 98b at different levels are alternately arranged such as in the gas blowing section 94 shown in FIGS. 10(a) and 10(b), even droplets of the washing solution blown upward can fall through a space between the first ejection holes 98a and the second ejection holes 98b. Therefore, the droplets can be efficiently removed.

For example, in the case where the washing/drying apparatus 90 is configured to wash and dry a moth-eye mold 100 which has a diameter of about 65 mm and a length of 370 mm, the diameter of the inner perimeter surface of the gas blowing section 94 is about 79 mm. In this case, the washing nozzle 92 is preferably distant from the gas blowing section 94 by about 100 mm. The projection section 96 is preferably projecting beyond the inner perimeter surface of the gas blowing section 94 by about 1 mm. After the washing solution is applied by the washing nozzle 92, for example, there is a 10 sec interval before the nitrogen gas is ejected by the gas blowing section 94. The washing nozzle 92, the gas blowing section 94 and the projection section 96 are moved downward at 1.0 cm/s. Meanwhile, the moth-eye mold 100 is rotated at rpm. The difference between the level of the first ejection holes 98a and the level of the second ejection holes 98b is, for example, about 50 mm. The inner perimeter surface of the gas blowing section 94 is provided with, for example, 14 first ejection holes 98a and 14 second ejection holes 98b.

Figure 11:
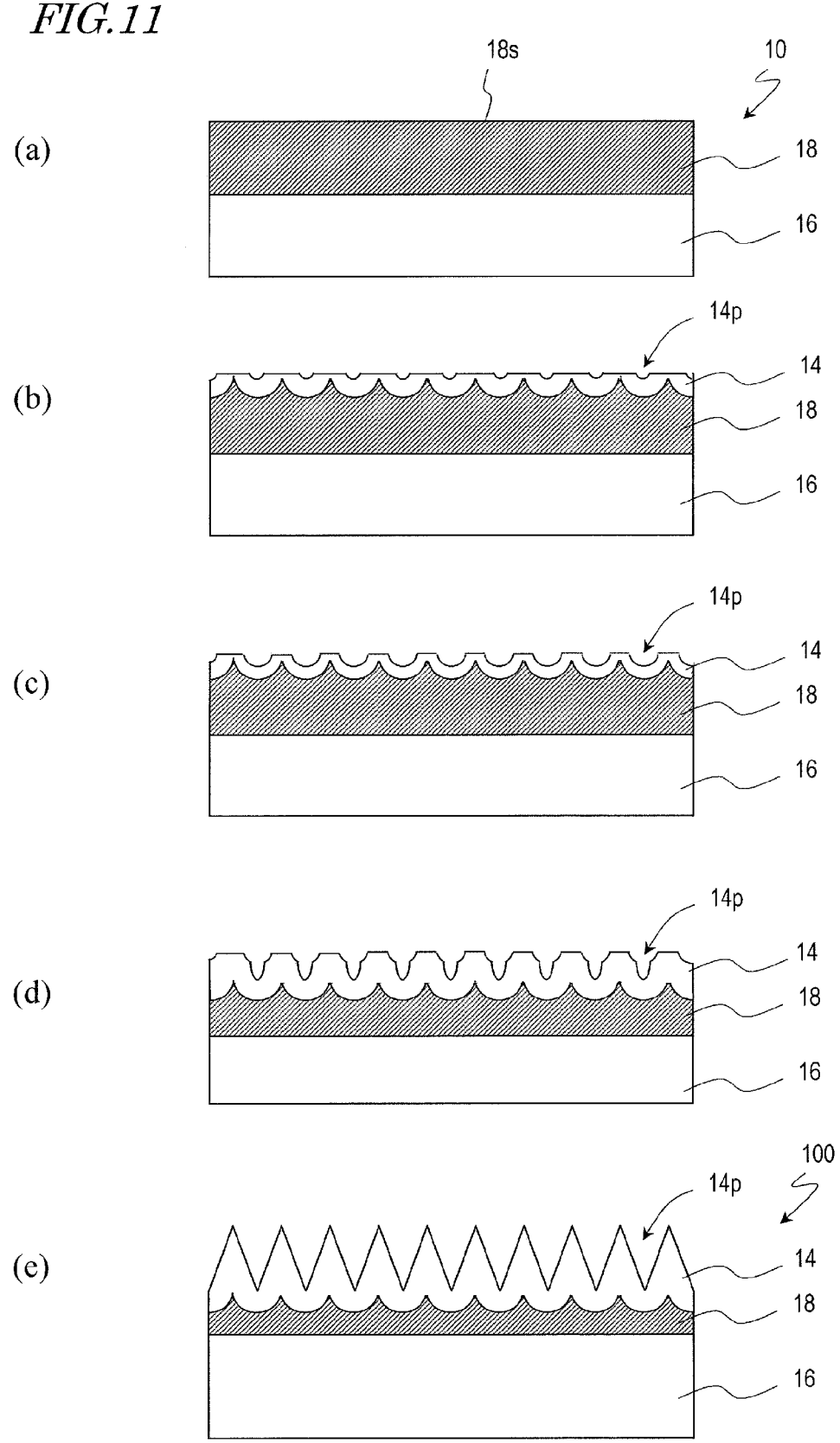
FIGS. 11 (a) to (e) are diagrams for illustrating a method for manufacturing a moth-eye mold 100.

Next, the process of manufacturing a moth-eye mold is described with reference to FIG. 11. FIGS. 11(a) to 11(e) are schematic cross-sectional views for illustrating a moth-eye mold manufacturing method. Note that, in the example described below, a moth-eye mold in the form of a flat plate is manufactured by performing anodization and etching on an aluminum base 10 which includes a substrate 16 and an aluminum film 18 deposited on the substrate 16.

First, an aluminum base 10 is provided as shown in FIG. 11(a). The aluminum base 10 includes a substrate 16 and an aluminum film 18 deposited on the substrate 16.

Then, a surface of the base 10 (a surface 18s of the aluminum film 18) is anodized to form a porous alumina layer 14 which has a plurality of micropores 14p (minute recessed portions) as shown in FIG. 11(b). The porous alumina layer 14 includes a porous layer which has the micropores 14p and a barrier layer. The porous alumina layer 14 may be formed by, for example, anodizing the surface 18s in an acidic electrolytic solution. The electrolytic solution used in the step of forming the porous alumina layer 14 may be, for example, an aqueous solution which contains an acid selected from the group consisting of oxalic acid, tartaric acid, phosphoric acid, chromic acid, citric acid, and malic acid. For example, the surface 18s of the aluminum film 18 is anodized for 30 seconds using an oxalic acid aqueous solution (concentration: 0.06 wt %, solution temperature: 5° C.) with an applied voltage of 80 V, whereby the porous alumina layer 14 is formed.

By modifying the anodization conditions (e.g., the type of the electrolytic solution, the applied voltage), the interpore distance, the depth of the micropores, the shape of the micropores, etc., can be adjusted. Note that the thickness of the porous alumina layer may be changed when necessary. The aluminum film 18 may be entirely anodized.

Then, the porous alumina layer 14 is brought into contact with an alumina etchant such that a predetermined amount is etched away, whereby the pore diameter of the micropores 14p is increased as shown in FIG. 11(c). Here, wet etching may be employed such that the pore wall and the barrier layer can be generally isotropically etched. By modifying the type and concentration of the etching solution and the etching duration, the etching amount (i.e., the size and depth of the micropores 14p) can be controlled. The etching solution used may be, for example, an aqueous solution of 10 mass % phosphoric acid or organic acid, such as formic acid, acetic acid, citric acid, or the like, or a chromium-phosphoric acid mixture solution. For example, the etching is performed for 25 minutes using phosphoric acid (1 mol/L, 30° C.), whereby the micropores 14p are enlarged.

Then, the aluminum film 18 is again partially anodized such that the micropores 14p are grown in the depth direction and the thickness of the porous alumina layer 14 is increased as shown in FIG. 11(d). Here, the growth of the micropores 14p starts at the bottoms of the previously-formed micropores 14p, and accordingly, the lateral surfaces of the micropores 14p have stepped shapes.

Thereafter, when necessary, the porous alumina layer 14 may be brought into contact with an alumina etchant to be etched such that the pore diameter of the micropores 14p is further increased. The etching solution used in this step may preferably be the above-described etching solution. Practically, the same etching solution may be used.

In this way, by repeating the anodization step and the etching step as described above, the moth-eye mold 100 that includes the porous alumina layer 14 which has a desired uneven shape is obtained as shown in FIG. 11(e). Thereafter, a mold release treatment is performed on the moth-eye mold 100, for example, according to the method which has previously been described with reference to FIG. 1, and is then used for production of an antireflection film.

In the above-described example, a moth-eye mold in the form of a flat plate is manufactured using an aluminum base 10 which includes a substrate 16 and an aluminum film 18 deposited on the substrate 16. A moth-eye mold in the form of a roll may be manufactured by, for example, performing anodization and etching on an aluminum base which includes a support in the form of a roll (e.g., a pipe made of stainless steel) and an aluminum film formed on the support in the form of a roll. Alternatively, a moth-eye mold in the form of a roll may be manufactured using a flexible polymer film as the substrate 16. An aluminum film is formed on the polymer film, and a surface of the aluminum film is anodized to form a porous alumina layer. Thereafter, the polymer film is fixed to the perimeter surface of the support in the form of a roll. In this way, a moth-eye mold in the form of a roll may be obtained.

Figure 12:
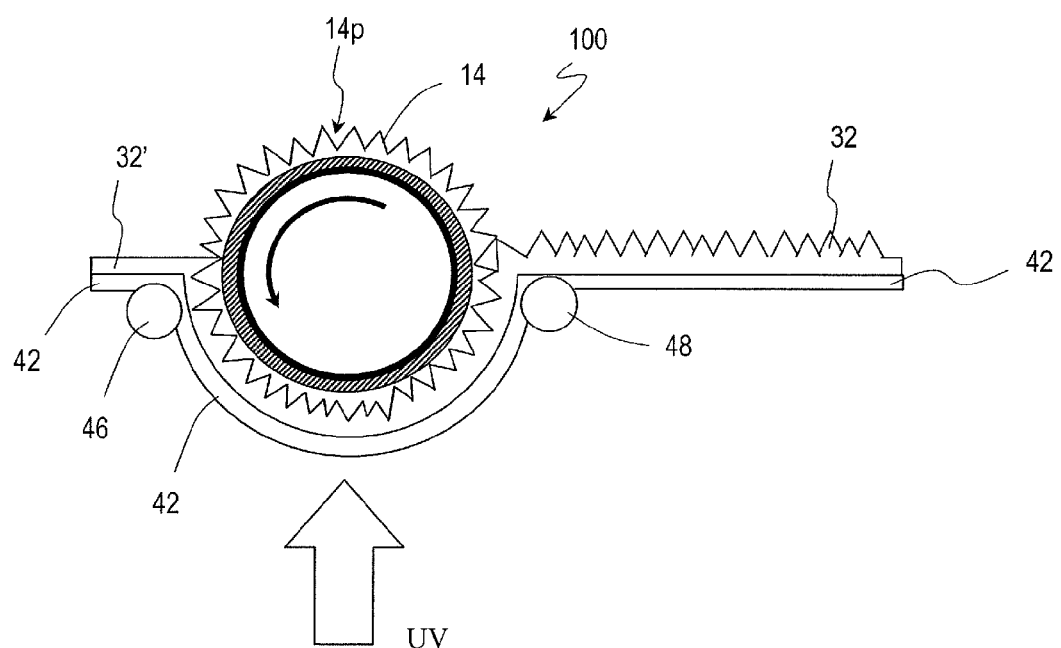
FIG. 12 A schematic cross-sectional view for illustrating the step of producing an antireflection film with the use of the moth-eye mold 100.

Then, an antireflection film production method of an embodiment of the present invention is described with reference to FIG. 12. FIG. 12 is a schematic cross-sectional view for illustrating a method for producing an antireflection film according to a roll-to-roll method.

Firstly, a moth-eye mold 100 in the form of a roll is provided. For example, the moth-eye mold 100 is provided on which a mold release treatment is performed according to the method which has previously been described with reference to FIG. 1.

Then, as shown in FIG. 12, a work 42 over which a UV-curable resin 32' is applied on its surface is maintained pressed against the moth-eye mold 100, and the UV-curable resin 32' is irradiated with ultraviolet (UV) rays such that the UV-curable resin 32' is cured. The UV-curable resin 32' used may be, for example, an acrylic resin. The work 42 may be, for example, a TAC (triacetyl cellulose) film. The work 42 is fed from an unshown feeder roller, and thereafter, the UV-curable resin 32' is applied over the surface of the work 42 using, for example, a slit coater or the like. The work 42 is supported by supporting rollers 46 and 48 as shown in FIG. 12. The supporting rollers 46 and 48 have rotation mechanisms for carrying the work 42. The moth-eye mold 100 in the form of a roll is rotated at a rotation speed corresponding to the carrying speed of the work 42 in a direction indicated by the arrow in FIG. 12.

Thereafter, the moth-eye mold 100 is separated from the work 42, whereby a cured material layer 32 to which an uneven structure of the moth-eye mold 100 (inverted moth-eye structure) is transferred is formed on the surface of the work 42. The work 42 which has the cured material layer 32 formed on the surface is wound up by an unshown winding roller.

To produce an antireflection film which has an excellent antireflection property, the two-dimensional size of the micropores 14p of the moth-eye mold 100 when viewed in a direction normal to the surface is preferably not less than 10 nm and less than 500 nm (Patent Documents 1, 2 and 4) and, more preferably, not less than 50 nm and less than 500 nm.

In the above-described example, a mold release treatment is performed on a moth-eye mold, although a mold release treatment method of an embodiment of the present invention is also applicable to a mold release treatment for a non-motheye mold which has a porous alumina layer over its surface. For example, the present invention is applicable to a mold release treatment for a mold which is used for formation of photonic liquid crystal.

INDUSTRIAL APPLICABILITY

A mold release treatment method of the present invention can be used as a mold release treatment method for a mold which is used for formation of an antireflection film, photonic crystal, or the like.

REFERENCE SIGNS LIST 12 support
14 porous alumina layer
14p micropores
18 aluminum film
52, 54 spray nozzle
80 mold release treatment apparatus
82 solvent nozzle
84 mold releasing agent nozzle
86 application chamber
88 solvent bath
90 washing/drying apparatus
92 washing nozzle
94 gas blowing section
98 ejection hole
100 moth-eye mold

The invention claimed is:

1. A mold release treatment method, comprising the steps of:
   (a) providing a mold releasing agent and a mold which has a porous alumina layer over its surface, the mold releasing agent containing a fluoric compound which has mold releasability and a solvent;
   (b) applying over the surface of the mold a solvent that is capable of dissolving the fluoric compound; and
   (c) after step (b), applying the mold releasing agent over the surface of the mold according to a spray coating method.

2. The method of claim 1, wherein the solvent used in step (b) is the same as the solvent contained in the mold releasing agent.

3. The method of claim 1, wherein the solvent contained in the mold releasing agent is a fluoric solvent.

4. The method of claim 1, wherein step (c) is performed in an atmosphere of the solvent that is capable of dissolving the fluoric compound.

5. The method of claim 1, further comprising (d) rinsing the surface of the mold after step (c).

6. The method of claim 1, further comprising (e) baking the surface of the mold between step (c) and step (d).

7. The method of claim 1, further comprising (f) washing the surface of the mold between step (a) and step (b).

8. The method of claim 1, wherein the porous alumina layer has an inverted moth-eye structure over its surface, the inverted moth-eye structure having a plurality of recessed portions whose two-dimensional size viewed in a direction normal to the surface is not less than 50 nm and less than 500 nm.

9. An apparatus for performing a mold release treatment on a surface of a mold, comprising:
   a mold releasing agent nozzle for applying a mold releasing agent over a surface of a mold, the mold releasing agent containing a fluoric compound which has mold releasability and a solvent;
   a solvent nozzle for applying over a surface of a mold a solvent that is capable of dissolving the fluoric compound;
   an application chamber which is provided with the mold releasing agent nozzle and the solvent nozzle; and
   a solvent bath in which the solvent that is capable of dissolving the fluoric compound is contained,
   wherein the solvent in the solvent bath evaporates to form an atmosphere of the solvent in the application chamber, and
   after the solvent is applied by the solvent nozzle over the surface of the mold, the mold releasing agent nozzle sprays the mold releasing agent over the surface of the mold in the application chamber.

* * * * *